(12) United States Patent  (10) Patent No.: US 9,008,619 B2
Lee et al.  (45) Date of Patent: Apr. 14, 2015

(54) MOBILE TERMINAL AND CONTROL METHOD OF THE SAME

(75) Inventors: Sanghyuck Lee, Gyeonggi-Do (KR); Eunju Lee, Gyeonggi-Do (KR); Byeongwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 13/590,869

(22) Filed: Aug. 21, 2012

(65) Prior Publication Data

US 2013/0102279 A1  Apr. 25, 2013

(30) Foreign Application Priority Data

Oct. 21, 2011 (KR) .......................... 10-2011-0108371
Oct. 21, 2011 (KR) .......................... 10-2011-0108372
Oct. 21, 2011 (KR) .......................... 10-2011-0108373

(51) Int. Cl.
 *H04M 1/66* (2006.01)
 *H04M 1/725* (2006.01)
 *H04M 1/67* (2006.01)

(52) U.S. Cl.
 CPC ............ *H04M 1/72586* (2013.01); *H04M 1/67* (2013.01); *H04M 1/72569* (2013.01); *H04M 1/72583* (2013.01); *H04M 2250/22* (2013.01); *H04M 2250/66* (2013.01)

(58) Field of Classification Search
 USPC ........ 455/410, 566, 552.1, 553.1, 550.1, 411; 715/741, 742, 743, 744, 769, 770, 772, 715/773, 814, 863, 864, 865, 866, 867; 726/16–19, 21, 27–31; 380/247, 248, 380/250
See application file for complete search history.

(56) References Cited

U.S. PATENT DOCUMENTS

2008/0009324 A1  1/2008 Patel
2008/0160958 A1  7/2008 Abichandani et al.
(Continued)

FOREIGN PATENT DOCUMENTS

CN  2833715  11/2006
CN  101331782  12/2008
(Continued)

OTHER PUBLICATIONS

European Patent Office Application Serial No. 12005490.3, Search Report dated Feb. 19, 2013, 6 pages.
(Continued)

*Primary Examiner* — Sharad Rampuria
*Assistant Examiner* — Sayed T Zewari
(74) *Attorney, Agent, or Firm* — Lee, Hong, Degerman, Kang & Waimey

(57) ABSTRACT

A mobile terminal that may be able to access a wireless communication network and a control method thereof are provided. The mobile terminal includes: a wireless communication unit configured to access a wireless communication network; a detection unit configured to detect a connectable wireless communication network through the wireless communication unit; and a controller outputting icons each corresponding to one or more wireless communication networks detected by the detection unit to a locked screen displayed in a locked state in which inputting of a control command with respect to an application is limited, releasing the locked state when selecting of any one of the output icons is detected, and controlling the wireless communication unit to access a wireless communication network corresponding to the selected icon.

30 Claims, 20 Drawing Sheets

(56) References Cited

U.S. PATENT DOCUMENTS

| | | | | |
|---|---|---|---|---|
| 2009/0163195 | A1* | 6/2009 | Kim et al. | 455/422.1 |
| 2010/0269040 | A1* | 10/2010 | Lee | 715/702 |
| 2011/0143817 | A1* | 6/2011 | Asabu et al. | 455/566 |

FOREIGN PATENT DOCUMENTS

| | | |
|---|---|---|
| CN | 101340660 | 1/2009 |
| CN | 101578900 | 11/2009 |
| CN | 101588617 | 11/2009 |
| CN | 101894023 | 11/2010 |
| CN | 101923423 | 12/2010 |
| CN | 102170495 | 8/2011 |
| WO | 2008058360 | 5/2008 |
| WO | 2008061347 | 5/2008 |

OTHER PUBLICATIONS

The State Intellectual Property Office of the People's Republic of China Application Serial No. 201210355728.7, Office Action dated Feb. 7, 2014, 15 pages.

* cited by examiner (a)

(b)

(a) FEEBLE        (b) GOOD (c) STRONG

MOBILE TERMINAL AND CONTROL METHOD OF THE SAME

CROSS-REFERENCE TO RELATED APPLICATION

Pursuant to 35 U.S.C. §119(a), this application claims the benefit of earlier filing date and right of priority to Korean Application No. 10-2011-0108371, 10-2011-0108372, 10-2011-0108373 filed on Oct. 21, 2011, the contents of which is incorporated by reference herein in its entirety.

BACKGROUND OF THE INVENTION

1. Field of the Invention

The present disclosure relates to a mobile terminal that may be able to access (or connectable to) a wireless communication network and a control method thereof.

2. Background of the Invention

Mobile terminals may be configured to perform various functions. Various functions may include, for example, a data and voice communication function, a function of capturing an image or video through a camera, a voice storage function, a function of reproducing (or playing) a music file through a speaker system, a function of displaying an image or a video, and the like. Some of mobile terminals include an additional function of executing games, while others may be implemented as multimedia players. In addition, recently, mobile terminals receive broadcast or multicast signals to allow users to view a video or television programs.

Efforts for supporting and increasing the functions of mobile terminals are ongoing. Such efforts may include improvement of software or hardware, as well as alteration and improvement of structural components forming mobile terminals.

Also, mobile terminals may be able to access (or connectable to) various communication networks through a wireless communication unit, and users may select any one of the connectable communication networks to perform data communication. However, in order for a user to select a communication network desired to be used, the user should change a communication mode through a configuration window, which is cumbersome.

In addition, when a mobile terminal is not in use, information regarding an accessed communication network is not known.

SUMMARY OF THE INVENTION

Therefore, an aspect of the detailed description is to provide a mobile terminal and a control method thereof capable of simply setting a communication network intended to be accessed.

Another aspect of the detailed description is to provide a mobile terminal and a control method thereof capable of providing information regarding a communication network to which a mobile terminal is currently connected to a user although the mobile terminal is in a locked state.

Another aspect of the detailed description is to provide a mobile terminal and a control method thereof capable of providing information regarding a communication network optimized for using an application.

To achieve these and other advantages and in accordance with the purpose of this specification, as embodied and broadly described herein, a mobile terminal includes: a mobile terminal main body; a wireless communication unit configured to access a wireless communication network; a detection unit configured to detect a connectable wireless communication network through the wireless communication unit; and a controller processing information related to a wireless communication network detected by the detection unit, such that the information is associated with the mobile terminal main body.

To achieve these and other advantages and in accordance with the purpose of this specification, as embodied and broadly described herein, a mobile terminal includes: a wireless communication unit configured to access a wireless communication network; a detection unit configured to detect a connectable wireless communication network through the wireless communication unit; and a controller outputting icons each corresponding to one or more wireless communication networks detected by the detection unit to a locked screen displayed in a locked state in which inputting of a control command with respect to an application is limited, releasing the locked state when selecting of any one of the output icons is detected, and controlling the wireless communication unit to access a wireless communication network corresponding to the selected icon.

In some embodiments, the selecting may be performed through a touch input applied to the locked screen, and the touch input may be a touch input corresponding to a release condition for releasing the locked state.

In some embodiments, the touch input may be a drag input that starts from a pre-set reference point and ends at any one of the icons, and the controller may control the wireless communication unit to access a wireless communication network corresponding to an icon positioned at a point at which the drag input ends.

In some embodiments, the detection unit may measure the strength of radio signals transmitted and received between the wireless communication unit and the detected wireless communication network.

In some embodiments, the controller may determine the positions of the icons output to the locked screen by using the measurement results.

In some embodiments, the cons may be disposed such that an icon corresponding to a wireless communication network having greater strength of a radio signal, the icon is closer to the reference point.

In some embodiments, the controller may set the icons output to the locked screen such that transparency of each icon is different, based on the measurement results.

In some embodiments, the controller may display an icon corresponding to a wireless communication network restricted from being used among the wireless communication networks detected by the detection unit, such that the icon is differentiated from the other icons.

In some embodiments, when the icon corresponding to the wireless communication network restricted from being used by a user is selected, notification information may be output.

In some embodiments, the controller may maintain the locked state.

In some embodiments, the controller may search for an application associated with the wireless communication corresponding to the selected icon, and when the locked state is released, the controller may display information related to the searched application on the display unit.

In some embodiments, an icon of the searched application may be displayed on the display unit.

In some embodiments, the controller may display data usage information on the icon output to the locked screen or a region adjacent to the icon, and the data usage information may be related to the wireless communication network corresponding to the icon.

To achieve these and other advantages and in accordance with the purpose of this specification, as embodied and broadly described herein, a control method of a mobile terminal, includes: detecting connectable wireless communication networks through a wireless communication unit; outputting icons corresponding to the detected wireless communication networks to a locked screen displayed in a locked state in which inputting of a control command with respect to an application is limited; and when any one of the output icons is selected, releasing the locked state and controlling the wireless communication unit to access a wireless communication network corresponding to the selected icon.

To achieve these and other advantages and in accordance with the purpose of this specification, as embodied and broadly described herein, a mobile terminal includes: a mobile terminal main body; a detection unit detecting communication mode information corresponding to at least one application installed in a main body and matching the detected communication mode information and the application; and a controller performing processing to associate an icon corresponding to the application and the communication mode information by using matching information related to the matching.

In some embodiments, the communication mode information may be information related to a communication mode optimized most to execute a function of the application among a plurality of communication modes available for accessing the main body.

In some embodiments, the icon corresponding to the application may be displayed on a display unit, and the controller may display the communication mode information matched to the application on a region adjacent to the icon corresponding to the application.

In some embodiments, the main body may further include a wireless communication unit connectable to a wireless communication network, and the controller may check a communication mode of the wireless communication network connected to the wireless communication unit, search for an application matched to the checked communication mode from the matching information, and display an icon of the searched application such that the icon is differentiated from icons of other applications.

In some embodiments, the controller may change the disposition of icons displayed on the display unit on the basis of the checked communication mode and the matching information.

In some embodiments, the controller may group the one or more applications on the basis of the fact that they are matched to the same communication mode information, and icons of the applications may be disposed on the display unit on the basis of the grouping.

In some embodiments, the main body may further include a wireless communication unit connectable to a wireless communication network, and the controller may check a communication mode of the wireless communication network connected to the wireless communication unit, and preferentially dispose a group corresponding to the checked communication mode on the display unit over other groups.

In some embodiments, the controller may display an icon of an application included in the group corresponding to the checked communication mode such that the icon is differentiated from an icon of an application included in a different group.

To achieve these and other advantages and in accordance with the purpose of this specification, as embodied and broadly described herein, a control method of a mobile terminal, includes: detecting communication mode information corresponding to at least one application; matching the detected communication mode and the application; and performing processing to associate an icon corresponding to the application and the communication mode information by using matching information related to the matching.

In some embodiments, in the processing to associate the icon and the communication mode, communication mode information matched to the application may be displayed on a region adjacent to the icon corresponding to the application.

In some embodiments, in the processing to associate the icon and the communication mode, matching information corresponding to a communication mode of a wireless communication network connected to a wireless communication unit may be searched, and an icon of an application related to the searched matching information may be displayed to be differentiated from an icon of a different application.

To achieve these and other advantages and in accordance with the purpose of this specification, as embodied and broadly described herein, a mobile terminal includes: a mobile terminal main body; a detection unit configured to detect a communication mode of a wireless communication network connected to a wireless communication unit; an illumination unit provided in the main body and outputting light beams of different colors; and a controller controlling the color of light output from the illumination unit.

In some embodiments, the controller may extract color information matched to the detected communication mode from a memory, and control the illumination unit to output light of a color corresponding to the extracted color information.

In some embodiments, the detection unit may measure the strength of a radio signal transmitted or received through the wireless communication unit, and the controller may control the intensity of light output from the illumination unit on the basis of the measurement results.

In some embodiments, the intensity of light output from the illumination unit may be stronger as the strength of the radio signal is greater.

In some embodiments, the detection unit may detect at least one wireless communication network having a communication mode different from that of the connected wireless communication network, and measure the strength of the radio signal transmitted and received through the detected wireless communication network, and when the strength of the radio signal of the detected wireless communication network is greater than that of the radio signal transmitted and received through the connected wireless communication network, the controller may change the wireless communication network connected to the wireless communication unit, to the detected wireless communication network, and changes the color of light output from the illumination unit such that light of a color matched to the communication mode of the changed wireless communication network is output.

In some embodiments, when the strength of a radio signal of the detected wireless communication network is greater than that of a radio signal transmitted and received through the connected wireless communication network, the controller may control the wireless communication unit to automatically access the detected wireless communication network.

In some embodiments, when the strength of a radio signal of the detected wireless communication network is greater than that of a radio signal transmitted and received through the connected wireless communication network, the controller may output information regarding the detected wireless communication network to a user and control the wireless communication unit to access the detected wireless communication network on the basis of the user selection.

In some embodiments, the main body may include a front surface, a lateral surface, and a rear surface, a display unit may be provided on the front surface, the illumination unit may be disposed to be adjacent to the edge of the rear surface and include an optical waveguide element, and output light beams of different colors according to the detected communication mode through the optical waveguide element.

To achieve these and other advantages and in accordance with the purpose of this specification, as embodied and broadly described herein, a control method of a mobile terminal including an illumination unit configured to output light beams of different colors, includes: detecting a communication mode of a wireless communication network connected to a wireless communication unit; extracting color information matched to the detected communication mode; and controlling the color of light output from the illumination unit such that light of a color corresponding to the extracted color information is output.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings. The suffixes attached to components of the wireless speaker, such as 'module' and 'unit or portion' were used for facilitation of the detailed description of the present disclosure. Therefore, the suffixes do not have different meanings from each other.

The mobile terminal according to the present disclosure may include a portable phone, a smart phone, a laptop computer, a digital broadcasting terminal, Personal Digital Assistants (PDA), Portable Multimedia Player (PMP), a navigation system, etc.

Figure 1:
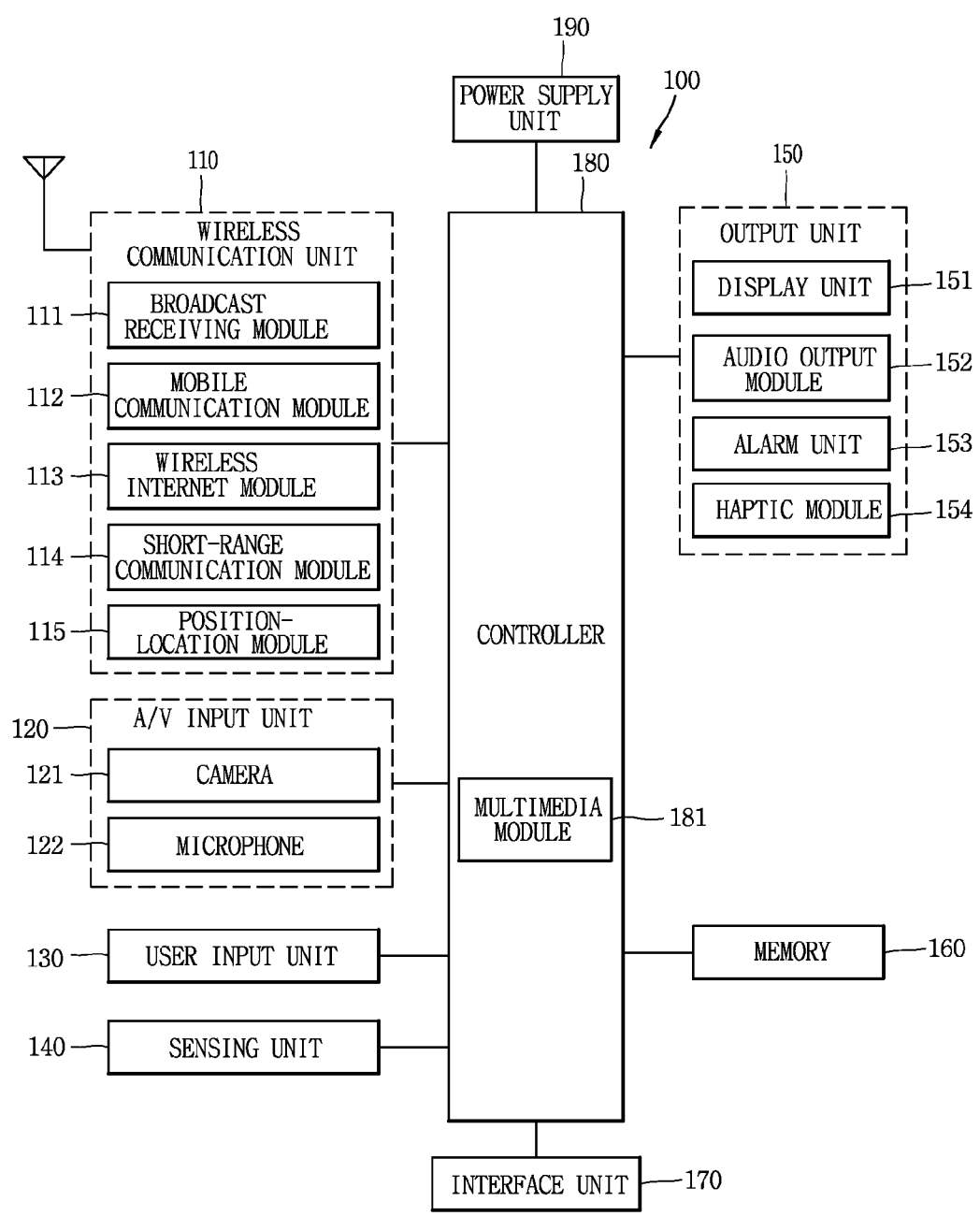
FIG. 1 is a block diagram of a mobile terminal according to an embodiment of the present invention.

FIG. 1 is a block diagram of a mobile terminal according to one embodiment of the present disclosure.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a mobile terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), Zig-Bee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's tou8ch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the voice output module 152.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit (hereinafter, will be referred to as 'touch screen' 151) in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
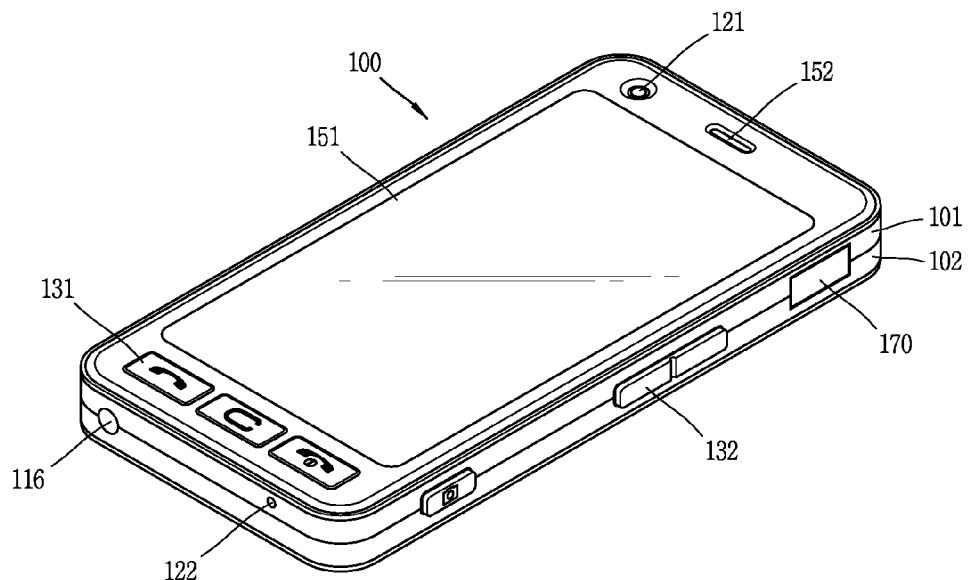
FIGS. 2A and 2B are front perspective views of the mobile terminal according to an embodiment of the present invention.
Figure 2B:
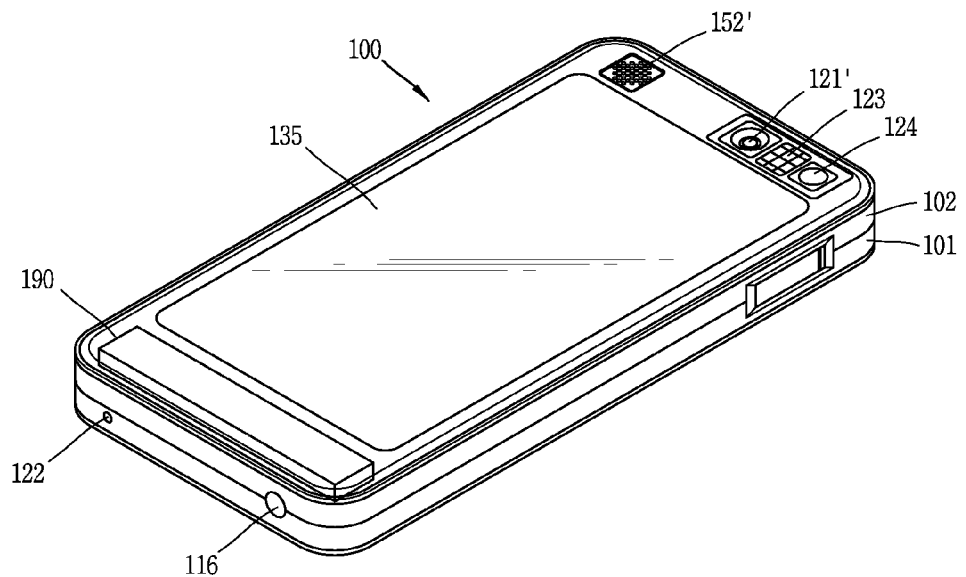

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, user input units 130/131 and 132, a microphone 122, an interface unit 170, etc.

The display unit 151 occupies most parts of a main surface of the front case 101. The audio output unit 152 and the camera 121 are arranged at a region adjacent to one end of the stereoscopic display unit 151, and the user input unit 131 and the microphone 122 are arranged at a region adjacent to another end of the display unit 152. The user input unit 131, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151, the touch pad 135 may be formed to be light-transmissive. In this case, if the display unit 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display unit 151 of the front case 101. The touch pad 135 may be disposed on the rear surface of the display unit 151 in parallel. The touch pad 135 may have a size equal to or smaller than that of the display unit 151.

Also, the controller 180 of the mobile terminal according to an embodiment of the present invention that may include at least one of the components as described above may output icons corresponding to wireless communication networks to a locked screen displayed in a locked state in which inputting of a control command with respect to an application is restricted.

Also, when user's selecting of any one of the icons output to the locked screen is detected, the controller 180 releases the locked state and controls the wireless communication unit 110 to access a wireless communication network corresponding to the selected icon.

Here, the wireless communication networks related to the icons displayed in the locked screen may be connectable (or accessible) through the wireless communication unit 110, and the wireless communication networks connectable to the wireless communication unit 110 may be detected by the detection unit 181.

Meanwhile, in order to clarify the expression of the present disclosure, a 'connectable wireless communication network' refers to every wireless communication network that can be connected to the wireless communication unit 110 and it is not necessarily limited to a currently available one. For example, although the mobile terminal according to an embodiment of the present invention supports a function of accessing all of '3G, 4G, and WiFi' communication networks, if it is not connected to the 'WiFi' network due to a current state of a communication network, setting, or the like, the 'connectable wireless communication network' may include 'WiFi'. In addition, when a currently available communication network is intended to be expressed in the present disclosure, it is expressed as 'available wireless communication network' so as to be discriminated from the foregoing 'connectable wireless communication network'.

Also, the detection unit 181 of the mobile terminal according to an embodiment of the present invention may be able to detect communication mode information corresponding to an application installed in the main body 100 and match the detected communication mode information and the application. In this case, the controller 180 may perform processing to associate an icon corresponding to the application and the communication mode information by using the matching information obtained by the detection unit 181.

Here, the communication mode information, as information related to a wireless communication network that may be connectable by the wireless communication unit 110, may be information related to the most appropriate wireless communication network to use an application installed in the main body 100.

For example, when a 'face book application' is most smoothly operated in the '3G communication mode', the detection unit 181 may detect that communication mode information of the 'face book application' is a '3G communication mode'. In this case, the controller 180 may detect communication mode information regarding each application by using information included in each application, and the detection unit 181 may automatically detect the communication mode information.

Also, the controller 180 may display the communication mode information detected by the detection unit 181 on an icon corresponding to an application or display an icon in a particular region, to thus inform the user about the communication mode information related to the application.

Also, the controller 180 may display the communication mode information detected by the detection unit 181 on the icon corresponding to the application or display an icon at a particular region to inform the user about the communication mode information related to the application.

Also, the detection unit 181 of the mobile terminal according to an embodiment of the present invention may be able to detect a communication mode of the wireless communication network connected with the wireless communication unit 110.

Here, a 'communication mode of the wireless communication network' indicates a wireless communication network, such as a '3G mode', a 'WiFi' mode, or the like, to which the wireless communication unit 110 is currently connected. When the wireless communication unit 110 is connected to a 3G communication network, it may be said that the mobile terminal is set in the 3G communication mode.

Meanwhile, the controller 180 according to an embodiment of the present invention may control the illumination unit 155 to output different colors on the basis of the communication mode detected by the detection unit 181.

Also, when there is a connectable communication network other than the 3G, 4G, and WiFi communication networks, the wireless communication unit 110 as described above may be connected thereto. Here, the 3G communication network refers to a communication network using 2 GHz frequency according to a $3^{rd}$-generation mobile communication technology standard. Also, the 4G communication network refers to a 4$^{th}$-generation mobile communication technology standard, and the WiFi communication network refers to a communication network allowing for wireless communication through a network using radiowaves or light, rather than using a fixed line.

Also, a wireless communication network detected by the detection unit 118 of the mobile terminal according to an embodiment of the present invention is mainly to perform data communication with the wireless communication unit 110 according to an embodiment of the present invention. When a communication network connected to the wireless communication unit 110 is changed (namely, when a communication mode is changed) according to a user selection or a setting of the detection unit 181 or the controller 180, a setting of a telephone network for terminating or originating a call may not be changed.

Hereinafter, first, for example, a control method of displaying information related to a wireless communication network on a locked screen in the mobile terminal related to an embodiment of the present invention will be described with reference to FIGS. 3 and 4.

Figure 3:
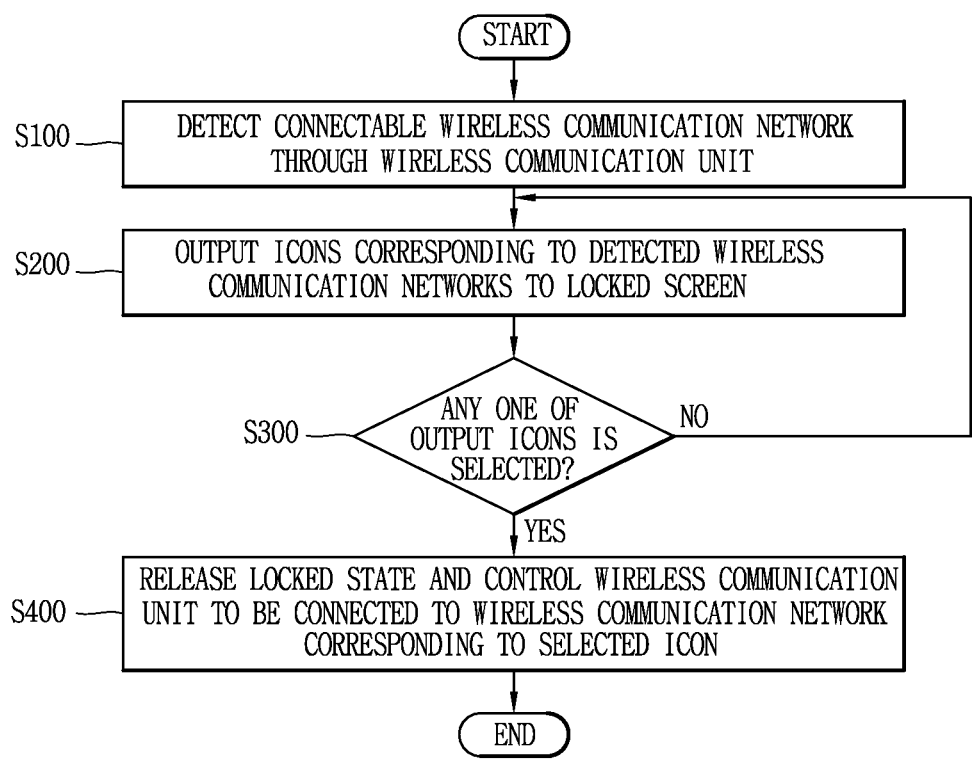
FIG. 3 is a flow chart illustrating a control method of the mobile terminal according to an embodiment disclosed in the present disclosure.
Figure 4:
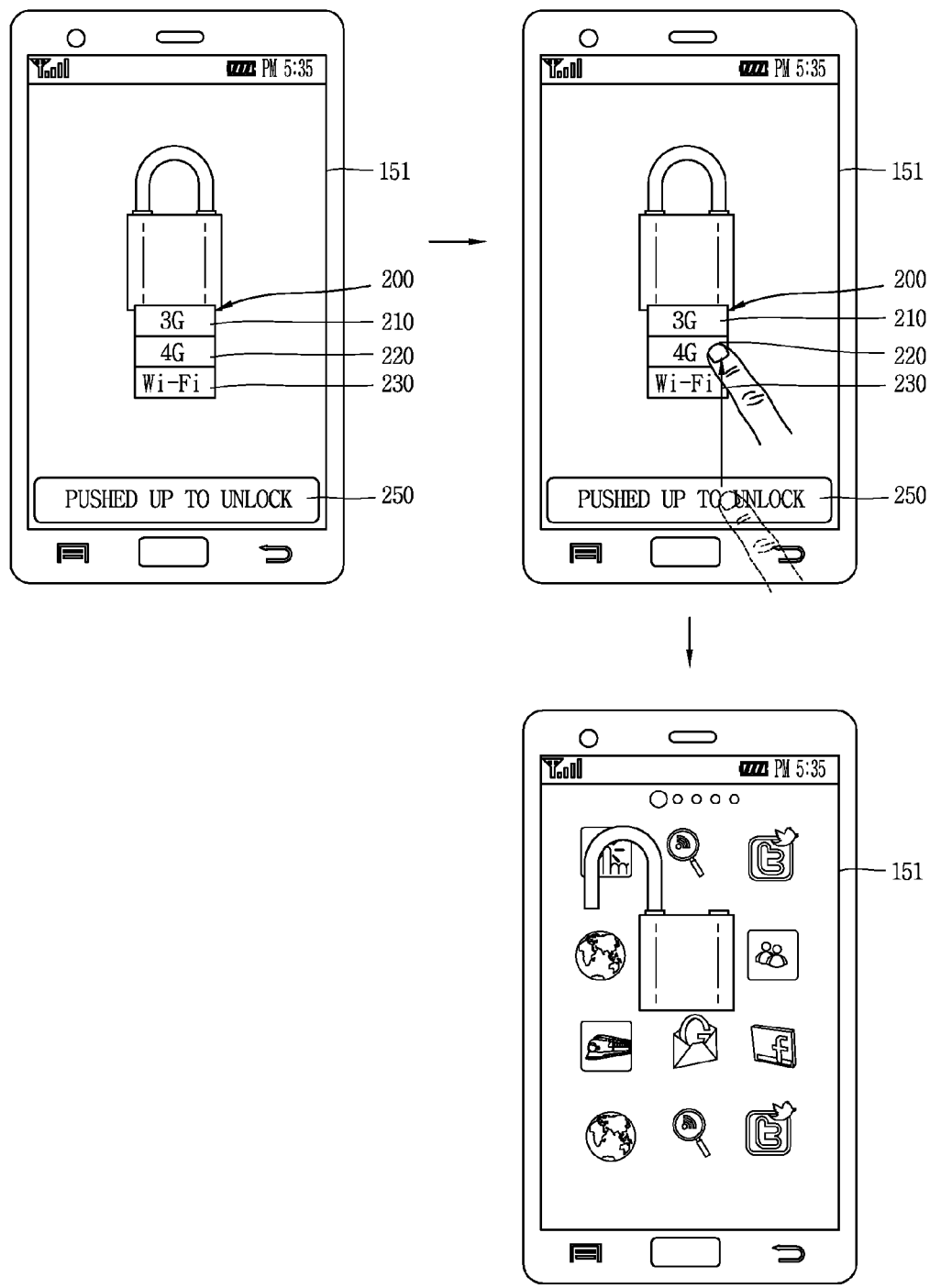
FIG. 4 is a conceptual view explaining a control method of the mobile terminal according to an embodiment disclosed in the present disclosure.

FIG. 3 is a flow chart illustrating a control method of the mobile terminal according to an embodiment disclosed in the present disclosure, and FIG. 4 is a conceptual view explaining a control method of the mobile terminal according to an embodiment disclosed in the present disclosure.

As shown in FIG. 3, the detection unit 181 of the mobile terminal according to an embodiment of the present invention detects a wireless communication network which may be connectable through the wireless communication unit 110 (S100). Here, the wireless communication network may be the wireless communication networks such as 2G, 3G, 4G, WiFi, and the like, transmitting and receiving radio signals according to different communication schemes as described above.

Next, the controller 180 outputs icons corresponding to the wireless communication networks detected by the detection unit 181 to the locked screen (S200).

Here, the 'locked screen' is displayed in a locked state in which inputting of a control command with respect to an application is restricted. Namely, in the locked state, inputting of a control command by the user with respect to applications included in the mobile terminal is restricted. This is to prevent functions or applications of the mobile terminal from being activated or deactivated according to an input of a control command not intended by the user in the mobile terminal mainly including a touch screen (the display unit 151 configured as a touch screen). Thus, in the locked state, inputting of a user's control command through the touch screen 151 and the other user input unit 130 may be restricted within a set range.

Meanwhile, in the locked state, inputting of a user's control command is restricted, but operations of functions and applications of the mobile terminal executed before the locked state was executed may continue to be executed.

A released state refers to a state in which inputting of a user's control command with respect to the mobile terminal is not restricted. Thus, in the released state, functions and applications of the mobile terminal are activated or deactivated according to a control command input by the user.

Here, the locked state may be executed when a user input is not detected during a pre-set time period with respect to the touch screen 151 and the other user input unit 130 provided in the mobile terminal. The pre-set time period may be changed according to a user setting.

Also, the locked state may be executed when the user presses a special key (e.g., a hold key) provided in the mobile terminal and previously set for the locked state.

Meanwhile, as shown in FIG. 4, when the locked screen is displayed on the display unit 151 on the basis of the user's pre-set key input, the controller 180 outputs icons 210, 220, and 230 corresponding to the wireless communication networks detected by the detection unit 181 to one region 200 of the display unit 151.

The controller 180 determines whether any one of the icons displayed on the locked screen is selected by the user (S300).

Here, for the 'selection', inputting using a touch input applied to the locked screen may be used. Also, the selection is a pre-set input corresponding to a release condition for releasing the locked state. For example, a 'release condition' for releasing the locked state may be a pre-set touch scheme. For example, the release condition may be detecting a touch input from one region to another region on the locked screen, or detecting a touch input corresponding to a pre-set pattern on the locked screen. Also, in another example, the release condition may be touch inputs successively input to one region.

Thus, in order to determine whether or not any one is selected in step S300, a touch input detected from the locked state should be a touch input corresponding to the 'release condition'.

A case in which the 'release condition' is a dragging (or sliding) input which starts from a pre-set release point (or a release region) and ends at a pre-set end point will be described as an example.

As shown in FIG. 4, when a user's drag touch starts from a release region 250 and ends at any one of the icons 210, 220, and 230 output to the locked screen, the controller 180 determines whether any one of the icons 210, 220, and 230 is positioned at the point at which the touch input ends.

Next, the controller 180 controls the wireless communication unit 110 to access a wireless communication network corresponding to the icon disposed at the point at which the touch input ends (S400).

In this case, the controller 180 controls the wireless communication unit 110 only when the touch input meets a release condition, and switches the locked state to a released state. Here, the released state is a state in which inputting of a user's control command with respect to the mobile terminal is not restricted. In the released state, functions and applications of the mobile terminal are activated or deactivated according to the control command input by the user.

Thus, as shown in FIG. 4, the controller 180 may release the locked state on the basis of the touch input that meets the release condition for releasing the locked state in the locked screen and selects the icon corresponding to a wireless communication network, and control the wireless communication unit 110 to access the communication network corresponding to the selected icon.

Also, in the above, the method of releasing the locked state by using the icon corresponding to the wireless communication network in the locked screen has been described, but a touch input may be received to immediately enter an idle screen without setting a wireless communication network in the locked screen.

For example, the locked state may be switched to a released state according to a drag input which starts from the release region 250 and ends at a different pre-set one region in which the icons 210, 220, and 230 are not displayed.

Meanwhile, when an icon corresponding to the wireless communication network is selected by the user, if the wireless communication unit 110 has been already connected to the wireless communication network corresponding to the icon, the controller 180 may release only the locked state without controlling the wireless communication unit 110 any further.

Also, the detection unit 181 may detect a wireless communication network to which the wireless communication unit 110 is currently connected, and the controller 180 may display information regarding the wireless communication network currently accessed by the wireless communication unit 110 on the locked screen to thus provide the information regarding the wireless communication network to the user.

Also, such information may be displayed on the icons 210, 220, and 230 displayed on the locked screen, and a text window may be generated and displayed on the locked screen.

As described above, in the mobile terminal and the control method thereof according to an embodiment of the present invention, a wireless communication network can be selected from a locked screen for releasing a locked state, and thus, user inconvenience of setting a wireless communication network in an additional setting window can be reduced.

Also, the detection unit 181 of the mobile terminal according to an embodiment of the present invention can measure the strength of radio signals transmitted and received between the wireless communication unit 110 and the connectable wireless communication network, and the controller 180 can change displaying of the locked screen on the basis of the strength of the radio signals.

This will be described in more detail with reference to FIGS. 5, 6, and 7.

Figure 5:
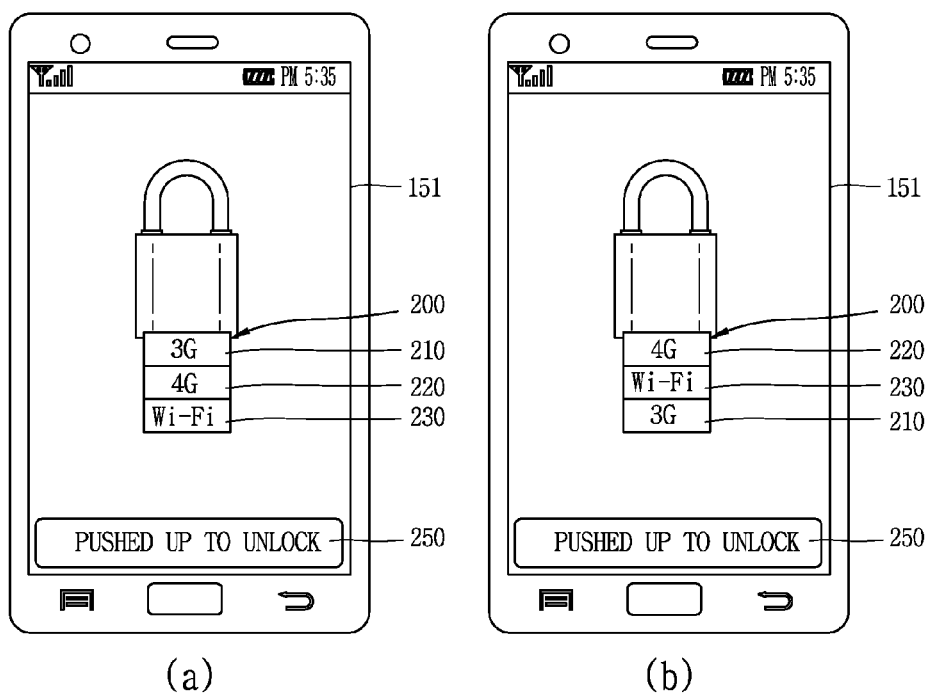
FIGS. 5, 6 and 7 are conceptual views explaining a method of displaying a communication mode in the mobile terminal according to an embodiment disclosed in the present disclosure.
Figure 5:
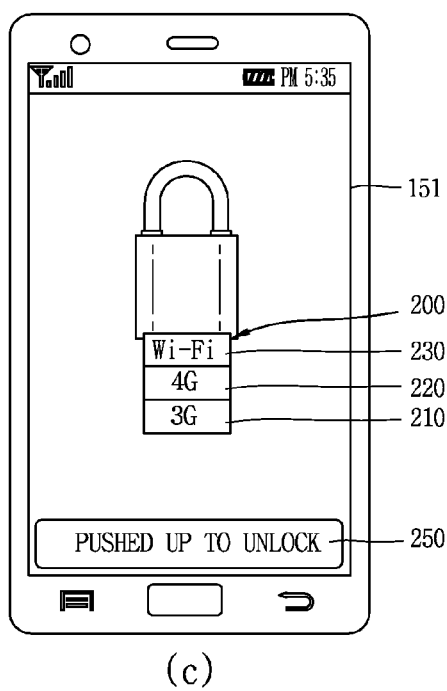
Figure 6:
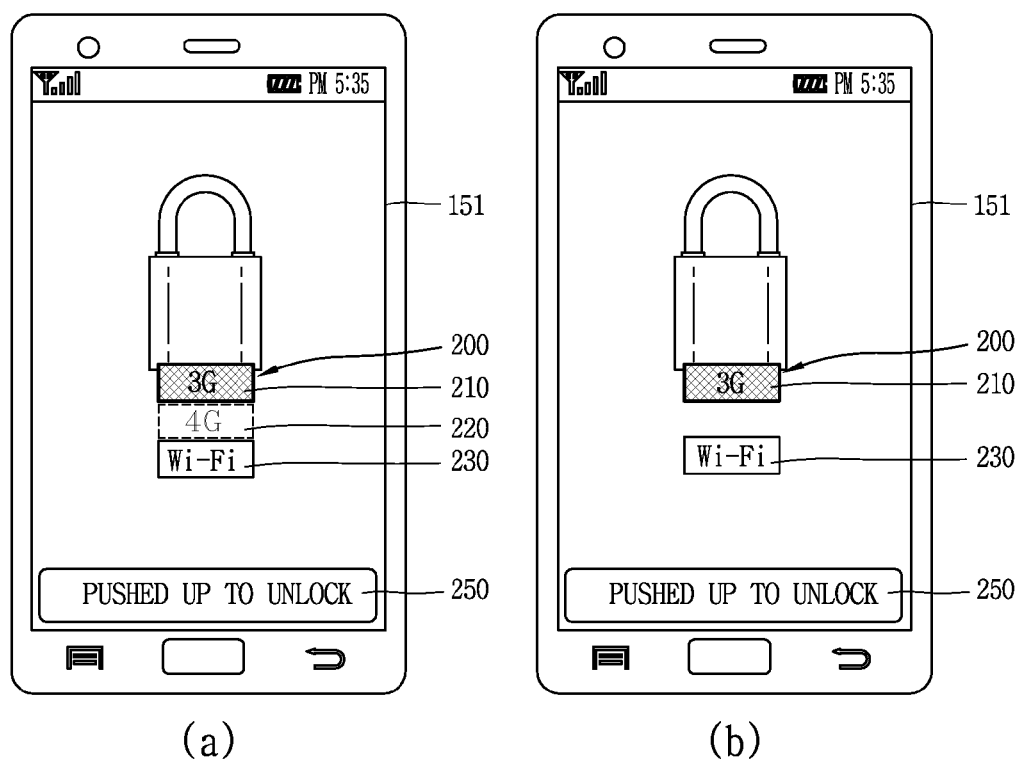
Figure 7:
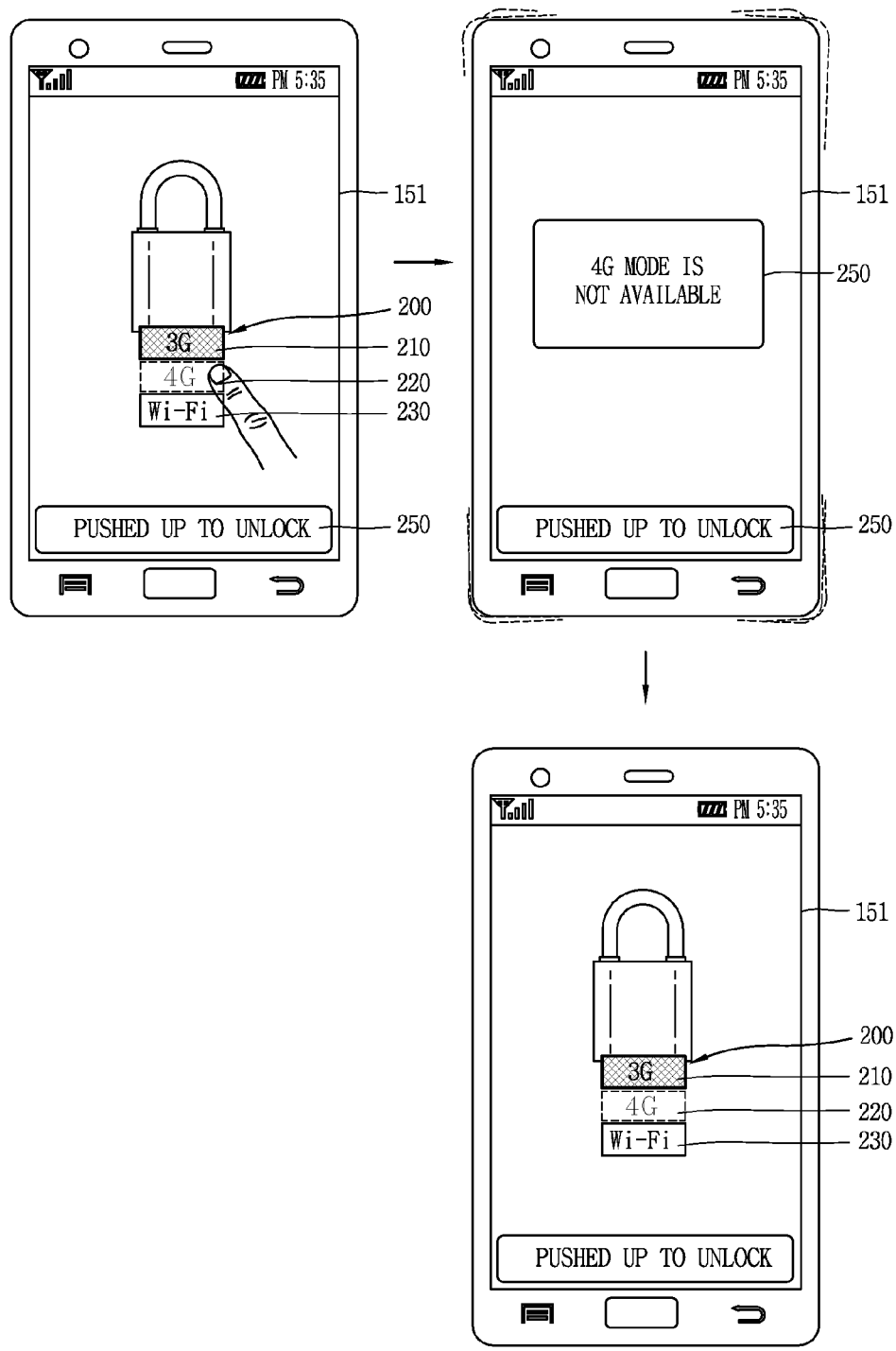

FIGS. 5, 6, and 7 are conceptual views explaining a method of displaying a communication mode in the mobile terminal according to an embodiment disclosed in the present disclosure.

First, strength of the radio signals refers to strength of signals transmitted and received between the wireless communication network and the wireless communication unit 110, and whether signals are transmitted and received smoothly may be recognized through the strength of the radio signals. Namely, the strength of the radio signals refers to reception sensitivity of signals.

Meanwhile, when the strength of radio signals corresponding to each of wireless communication networks connectable by the detection unit 181 are measured, information regarding the measurement results may be displayed on the locked screen.

For example, as shown in FIG. 5, the controller 180 may determine positions of the icons displayed on the locked screen by giving precedence to a wireless communication network having the greatest strength of a radio signal, i.e., a wireless communication network having the best reception sensitivity, from a pre-set reference point.

Here, the reference point may be determined by the controller 180 or the user. In FIG. 5, it is assumed that the uppermost portion of the region in which the icons are displayed in a vertical direction of the mobile terminal is a reference point.

For example, in FIG. 5(a), when the strength of the radio signals is the greatest starting from the 3G communication network, the 4G communication network, and the WiFi communication network in order according to the detection results of the detection unit 181, the controller 180 may display the icon 210 corresponding to the 3G communication network at the uppermost portion and sequentially display the icons 220 and 230 corresponding to the 4G communication network and the WiFi communication network, respectively, under the icon 210.

In another example, in FIG. 5(b), when the strength of the radio signals is the greatest starting from the 4G communication network, the WiFi communication network, and the 3G communication network in order according to the detection results of the detection unit 181, the controller 180 may display the icon 220 corresponding to the 4G communication network at the uppermost portion and sequentially display the icons 230 and 210 corresponding to the WiFi communication network and the 3G communication network, respectively, under the icon 220.

In another example, in FIG. 5(c), when the strength of the radio signals is the greatest starting from the WiFi communication network, the 4G communication network, and the 3G communication network in order according to the detection results of the detection unit 181, the controller 180 may display the icon 230 corresponding to the WiFi communication network at the uppermost portion and sequentially display the icons 220 and 210 corresponding to the 4G communication network and the 3G communication network, respectively, under the icon 230.

Also, as shown in FIG. 6, the controller 180 may adjust transparency of the icons displayed on the locked screen according to the degree of strength the radio signals.

For example, in FIG. 6(a), when the strength of the radio signal of the 3G communication network is the greatest, the strength of the radio signal of the WiFi communication network is good, and the strength of the radio signal of the 4G communication network is very weak, the controller 180 may display the icon 210 corresponding to the 3G communication network such that it is darker than the other icons. In this case, besides displaying darker, the controller 180 may inform the user that the strength of the radio signal is the greatest through various display methods such as blinking the icon 200, or the like.

Also, the controller 180 may display the icon 230 corresponding to the 4G communication network having the weakest strength of the radio signal such that it is transparent or indicate it by a dotted line, and as shown in FIG. 6(b), the controller 180 may not display the icon corresponding to the 4G communication network.

Meanwhile, the transparency of the icons corresponding to the strengths of radio signals, respectively, and the display method of the icons may be variably modified by the user or the controller 180.

Also, as shown in FIG. 7, when the icon 220 corresponding to a wireless communication network whose radio signal is too weak to be used, the controller 180 may output corresponding information on a notification window 250 or output the corresponding information through vibration or a sound.

Also, when the icon 220 is selected, the controller 180 may display the locked screen again, rather than releasing the locked state. Also, when the icon 220 is selected, the controller 180 may switch the locked state to a released state and control to continuously connect to the wireless communication network which was used before entering the locked state.

As described above, in the mobile terminal and the control method thereof according to an embodiment of the present invention, by displaying the information related to the strength of radio signals transmitted and received between the wireless communication unit and the wireless communication network on the locked screen, the user can be guided to select a communication network having good reception sensitivity in selecting a wireless communication network.

Figure 8:
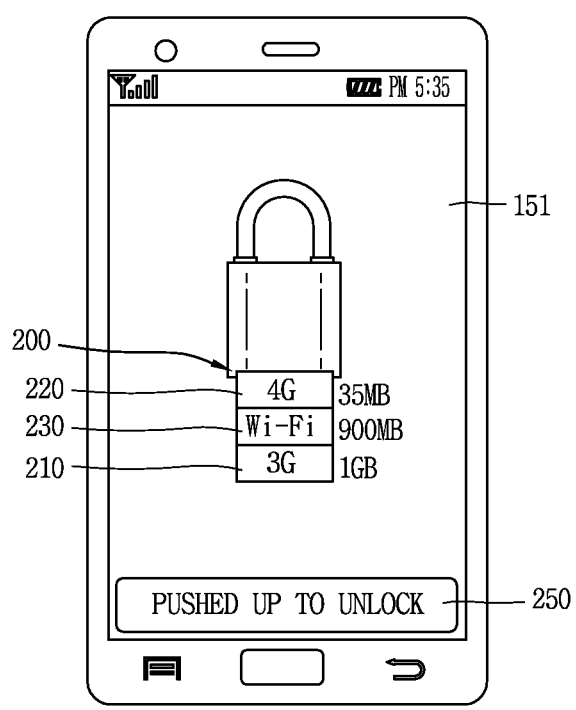
FIG. 8 is a conceptual view explaining a method of displaying a usage amount of data in the mobile terminal according to an embodiment disclosed in the present disclosure.

Also, besides, the detection unit 181 according to an embodiment of the present invention may detect a usage amount of data communication corresponding to each wireless communication network. Also, as shown in FIG. 8, the controller 180 may display information related to the amount of data communication on the locked screen. Namely, the user may recognize the amount of data used up to now through the data usage amount information displayed on the locked screen, and in addition, the information related to the amount of used data may help the user select a communication network to be used afterwards.

Also, the mobile terminal according to an embodiment of the present invention may display icons corresponding to wireless communication networks on the locked screen by using various methods.

Figure 9:
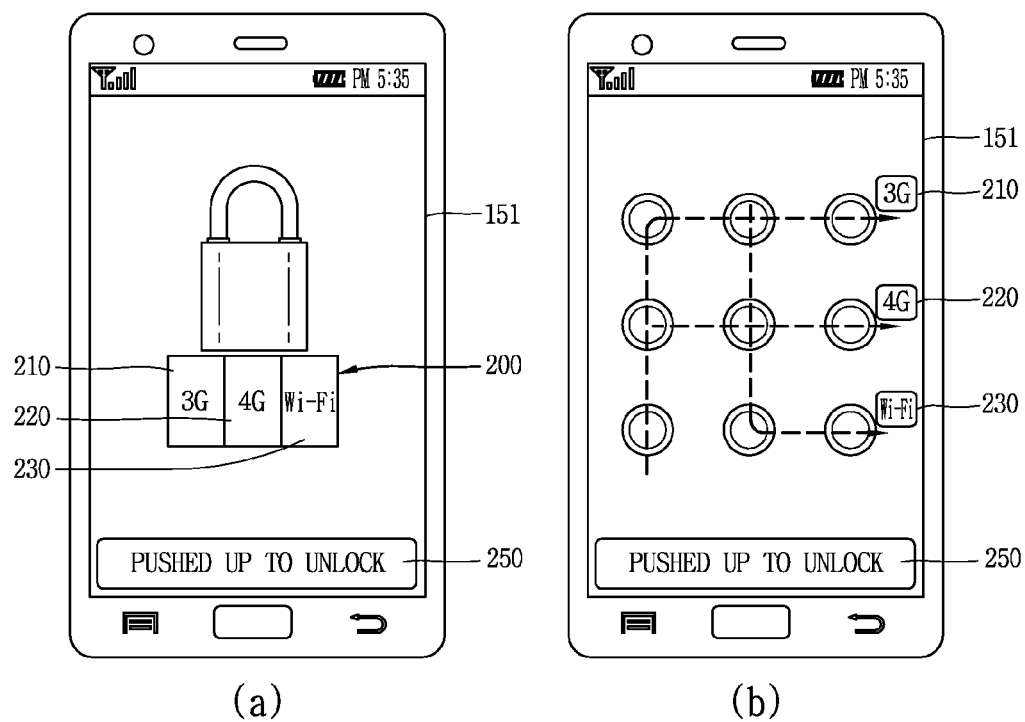
FIG. 9 is a conceptual view explaining a method of displaying a communication mode on a locked screen in the mobile terminal according to an embodiment disclosed in the present disclosure.

FIG. 9 is a conceptual view explaining a method of displaying a communication mode on a locked screen in the mobile terminal according to an embodiment disclosed in the present disclosure.

As shown in FIG. 4, the controller 180 according to an embodiment of the present invention may output the icons 210, 220, and 230 in a vertical direction, and besides, the controller 180 may output icons in various manners.

For example, as shown in FIG. 9(*a*), the controller 180 may output the icons 210, 220, and 230 in a horizontal direction, and based on a drag input, starting from the release region 250, with respect to any one of the icons, the controller 180 may set a wireless communication network and release the locked state.

Also, as shown in FIG. 9(*b*), the controller 180 may release the locked state by using a touch input corresponding to a pattern. In this case, the controller 180 may output icons related to wireless communication networks such that the icons correspond to a plurality of patterns, and when a touch input with respect to any one of the patterns is applied, the controller 180 may control the wireless communication unit 110 to access the corresponding wireless communication network.

As described above, in the mobile terminal and the control method thereof according to an embodiment of the present invention, a locked state can be released by using various types of touch inputs. In addition, in the mobile terminal and the control method thereof according to an embodiment of the present invention, icons corresponding to wireless communication networks are output to a locked screen on the basis of various types of touch inputs, and when any one of the icons is selected, a corresponding wireless communication network can be set.

Also, as described above, in the mobile terminal and the control method thereof according to an embodiment of the present invention, an application associated with a wireless communication network corresponding to an icon selected from a locked screen may be output to an idle screen over other applications.

Figure 10:
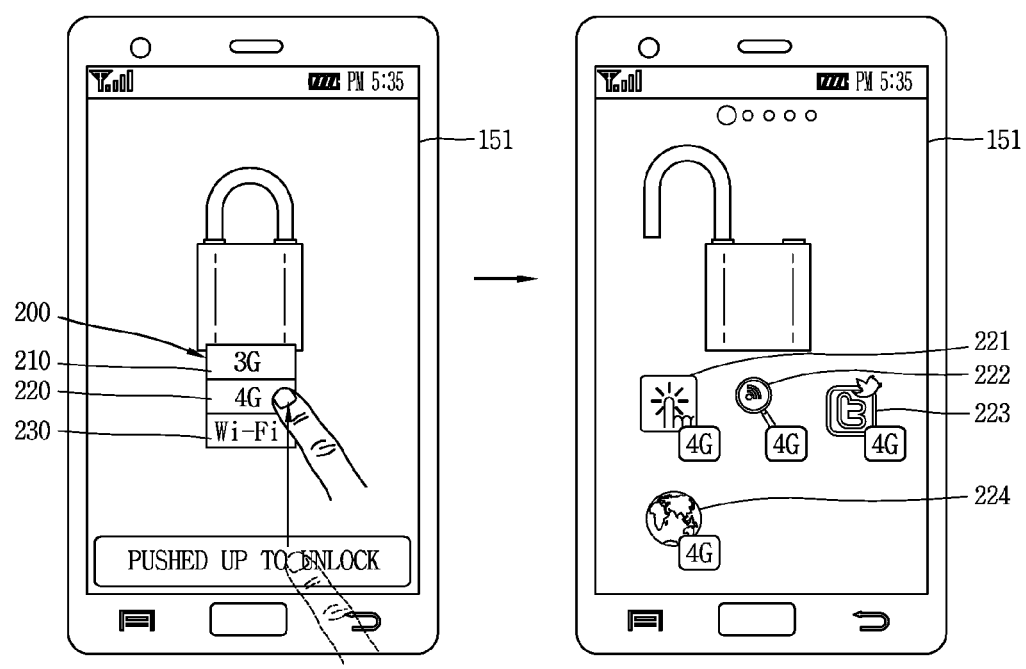
FIG. 10 is a conceptual view explaining a method of displaying an idle screen in the mobile terminal according to an embodiment disclosed in the present disclosure.

FIG. 10 is a conceptual view explaining a method of displaying an idle screen in the mobile terminal according to an embodiment disclosed in the present disclosure.

For example, when the 4G communication network is selected from the locked screen by the user and the wireless communication unit 110 is controlled to access the 4G communication network according to a setting of the controller 180, the controller 180 may display icons 211, 222, 223, and 224 of applications related to the 4G communication network on an idle screen.

In this case, as described above, the applications related to the 4G communication network may be detected by the detection unit 181.

As described above, in the mobile terminal and the control method thereof according to an embodiment of the present invention, by selecting a wireless communication network connected to the wireless communication unit from the locked screen, user inconvenience of selecting a wireless communication network separately or additionally can be reduced.

Hereinafter, a method of displaying an icon of an application on an idle screen on the basis of a wireless communication network connected to the wireless communication unit.

Figure 11:
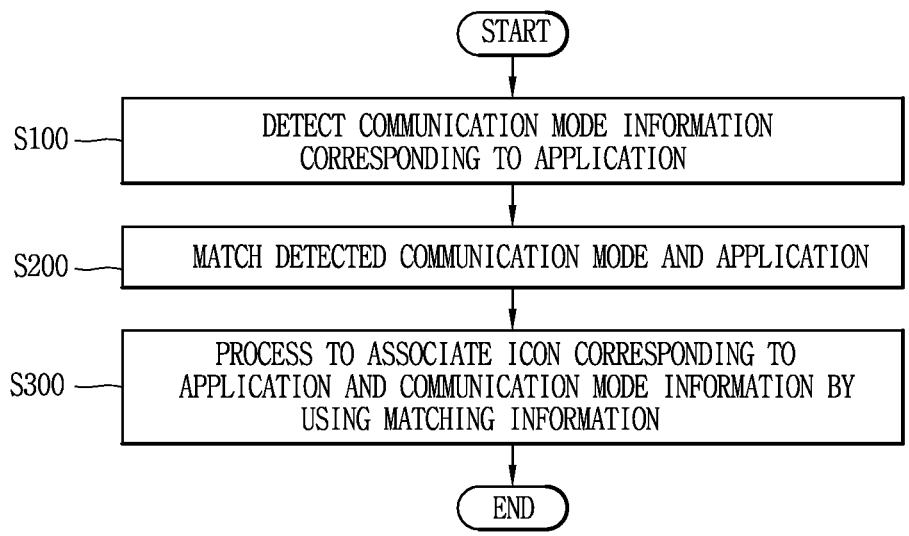
FIG. 11 is a flow chart illustrating a control method of a mobile terminal according to an embodiment different from that of FIG. 3 disclosed in the present disclosure.
Figure 12:
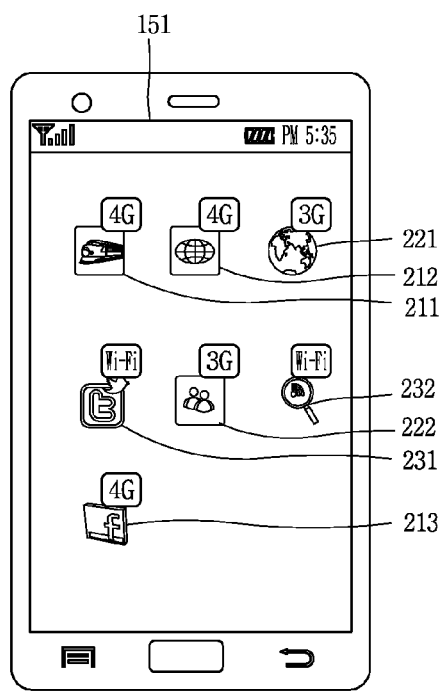
FIG. 12 is a conceptual view explaining the control method of FIG. 11.
Figure 12:
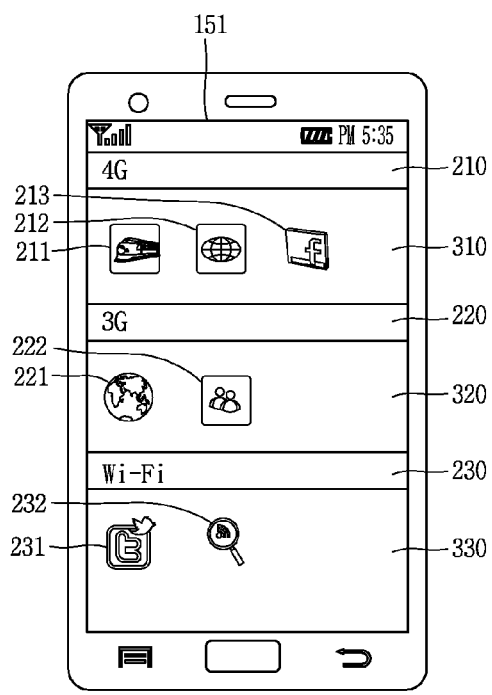

FIG. 11 is a flow chart illustrating a control method of a mobile terminal according to an embodiment different from that of FIG. 3 disclosed in the present disclosure, and FIG. 12 is a conceptual view explaining the control method of FIG. 11.

First, the detection unit 181 in FIG. 1 according to an embodiment of the present invention detects communication mode information corresponding to at least one application installed in the main body 100 (S100).

Here, as described above, the communication mode information, as information related to a wireless communication network that may be connectable by the wireless communication unit 110, may be information related to the most appropriate wireless communication network to use an application installed in the main body 100. For example, when a 'face book application' is most smoothly operated in the '3G communication mode', the detection unit 181 may detect that communication mode information of the 'face book application' is a '3G communication mode'. In this case, the controller 180 may detect communication mode information regarding each application by using information included in each application, and the detection unit 181 may automatically detect the communication mode information.

Namely, the communication mode information may be information related to a communication mode optimized most to execute a function of a particular application among a plurality of communication modes that can be connected to the main body.

Next, the detection unit 181 matches the detected communication mode information and corresponding applications, and stores the matching information obtained by matching the communication mode information and the applications in the memory 160.

Thereafter, when icons related to the applications installed in the main body 100 are displayed on the idle screen, the controller 180 performs processing such that the icons corresponding to the applications are associated with the communication mode information (S300).

For example, as shown in FIG. 12(*a*), the controller 180 may display the communication mode information in a region adjacent to each of the icons 211, 212, 213, 221, 222, 231, 233 of the applications displayed on the idle screen, or as shown in FIG. 12(*b*), the controller 10 displays the icons in particular regions 310, 320, 330 on the idle screen, thus providing the communication mode information related to the applications to the user.

Here, the 'idle screen' is a screen displayed on the display unit 151 in a released state (i.e., in a state in which the locked state is released), and the icons of the applications installed in the main body 100 may be displayed on the idle screen. Namely, the idle screen is a screen on which an executed screen of an application is not displayed, and the screen is displayed in a state in which selecting of a certain application by a user is awaited.

Namely, as shown in FIG. 12(*a*), the controller 181 displays communication mode information of the applications displayed on the idle screen of the display unit 151 by using the matching information stored in the memory 160. For example, in case in which matching information of the icon 211 of a 'subway application' is a '4G communication mode', the information '4G' may be output to a region of the icon 211.

Also, as shown in FIG. 12(b), the controller 181 may divide the screen into a plurality of regions 310, 320, 330 on the basis of wireless communication networks connectable to the wireless communication unit 110, and display icons of the applications to which corresponding wireless mode information is matched in each region.

As described above, in the mobile terminal and the control method thereof according to an embodiment of the present invention, by displaying communication mode information on the icons of the applications displayed on the idle screen, communication mode information optimized to execute an application can be provided to the user.

Also, the controller 180 according to an embodiment of the present invention can check (or recognize) a wireless communication network currently connected to the wireless communication unit 110 and display an icon of the application having the communication mode information related to the wireless communication network connected to the wireless communication unit 110 such that the icon is discriminated from icons of other applications.

Figure 13A:
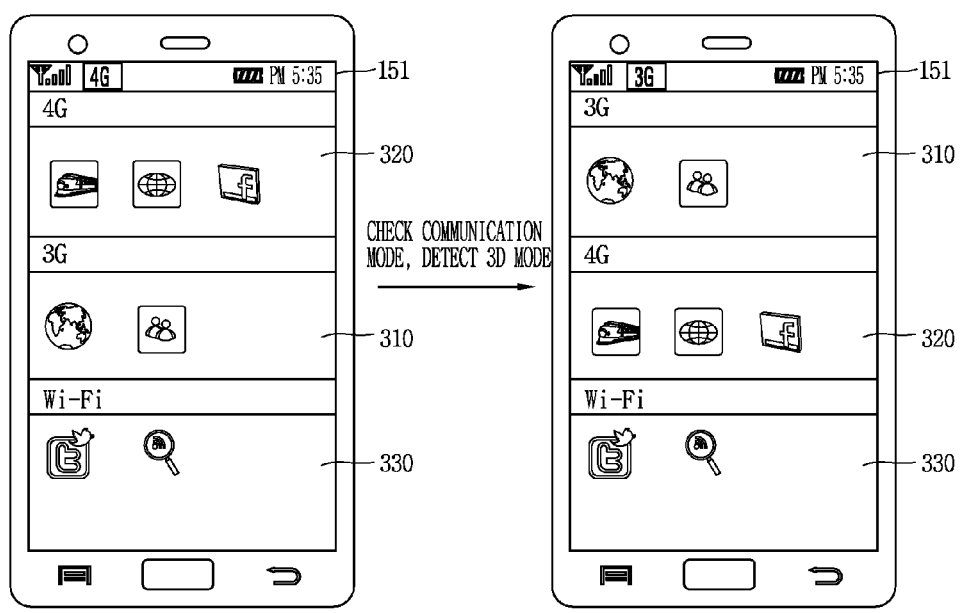
FIGS. 13A, 13B and 14 are conceptual views explaining a method of displaying an idle screen according to a communication mode set in the mobile terminal disclosed in the present disclosure.
Figure 13B:
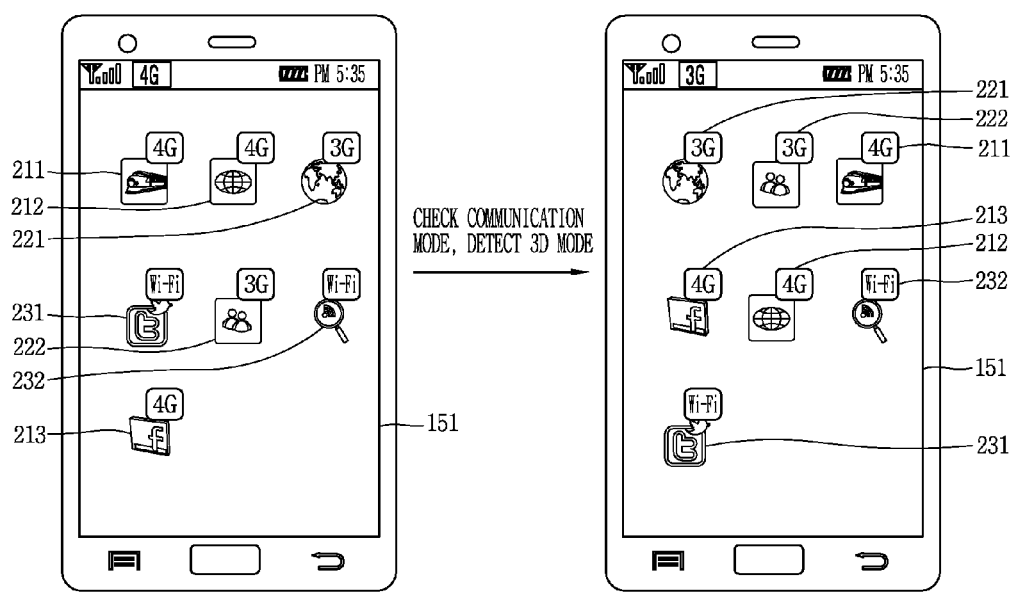
Figure 14:
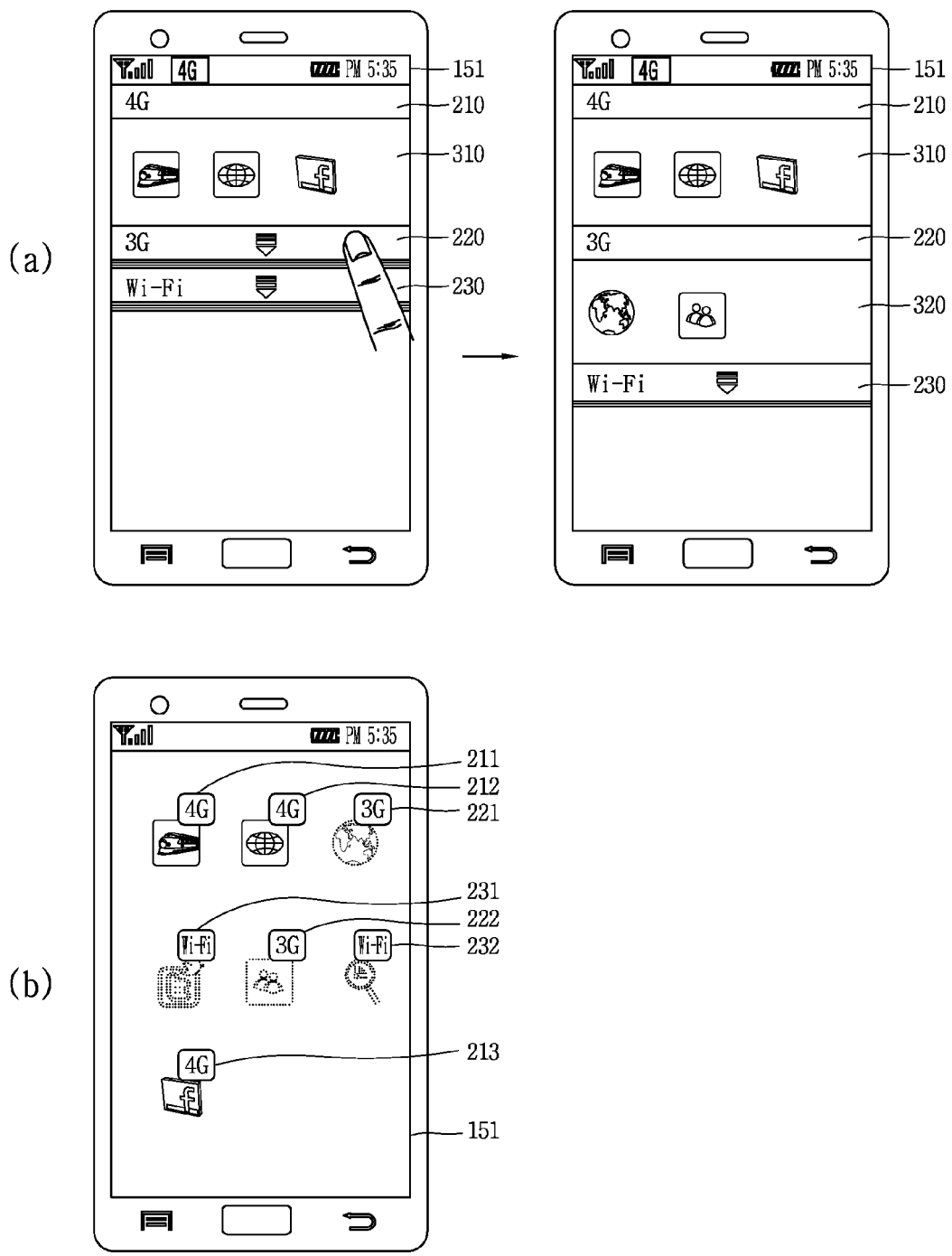

FIGS. 13A, 13B, and 14 are conceptual views explaining a method of displaying an idle screen according to a communication mode set in the mobile terminal disclosed in the present disclosure.

For example, as shown in FIG. 13A, when a wireless communication network currently connected to the wireless communication unit 110 is the 4G communication network according to a checking result of the controller 180, the controller 180 may display a region 320 corresponding to the 4G communication network on an idle screen over the other regions 310 and 330. Also, when the communication network connected to the wireless communication unit 110 is changed by the user or according to a setting of the controller 180, namely, for example, when the 4G communication network is switched to 3G communication network, the controller 180 may change the disposition of the regions displayed on the idle screen such that the region 310 is displayed over the other regions 320 and 330.

In another example, as shown in FIG. 13B, when a wireless communication network currently connected to the wireless communication unit 110 is the 4G communication network according to a checking result of the controller 180, the controller 180 may search for an application having matching information corresponding to the 4G communication network and display icons 211, 212, 213 of searched applications such that they are discriminated from other icons. Here, the controller 180 may display the icons 211, 212, 213 of the applications such that they are discriminated from those of other applications in various manners, namely, the icons 211, 212, 213 blink or are displayed to be darker, and the like.

Also, when the wireless communication network connected to the wireless communication unit 110 is switched, for example, when the wireless communication network connected to the wireless communication unit 110 is switched from the 4G communication network to the 3D communication network, the controller 180 may display the icons 221, 222 of the relevant applications over the other icons on the idle screen on the basis of the switching.

Also, as shown in FIG. 14(a), the controller 180 may display only icons of applications related to the communication network currently connected to the wireless communication unit 110 on the idle screen. For example, when the 4G communication network is currently connected to the wireless communication unit 110, the controller 180 may display icons of applications having the matching information related to the 4G communication network in the pre-set region 310 and may not display regions related to other communication networks. Namely, the controller 180 may display the icons of the applications related to the currently connected communication network such that they are differentiated from icons of the other applications.

In this case, when an information display window 220 is selected by the user, the controller 180 may display icons of the applications related to the selected communication network in the corresponding region 320.

Also, as shown in FIG. 14(b), the controller 180 may display the icons 211, 212, 213 of the applications related to the currently connected communication network such that they are darker, and icons 221, 222, 231, 232 of applications related to other communication networks such that they are lighter.

Besides, when the communication network connected to the wireless communication unit 110 is changed, the controller 180 may activate an application whose operation was ongoing in relation to the changed communication network. For example, a first application is activated only in a WiFi mode and the first application downloads a file in the WiFi mode. In this state, when the communication mode is changed, the downloading is stopped, and thereafter, when the communication network is changed to the WiFi mode again, the controller 180 may resume the operation of the first application.

In this case, the controller 180 may display relevant information in a region adjacent to the icon of the application or inform the user accordingly by using a separate information window.

Also, besides, the controller 180 may allot a page to the idle screen to display the matching information obtained by matching icons of applications in relation to the communication network information, and may set to display it or may not on the basis of a user selection.

As described above, in the mobile terminal and the control method thereof according to an embodiment of the present invention, by displaying communication mode information related to applications on the idle screen, the user can be guided to set a communication mode the most appropriate to execute an application.

Hereinafter, a method of setting different colors of light output from the mobile terminal on the basis of a communication mode of a wireless communication network connected to the wireless communication unit.

Figure 15:
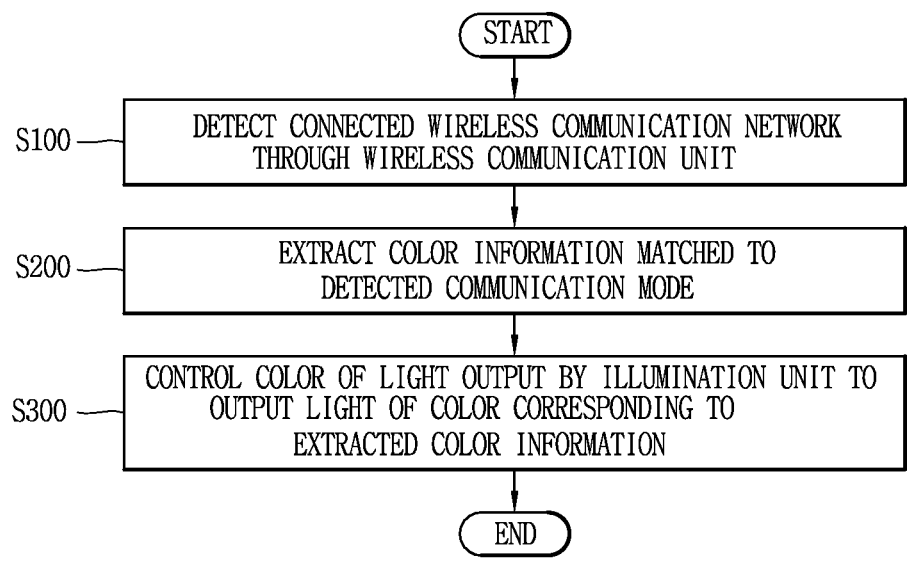
FIG. 15 is a flow chart explaining a control method of a mobile terminal according to an embodiment different from those of FIGS. 3 and 11 disclosed in the present disclosure.
Figure 16:
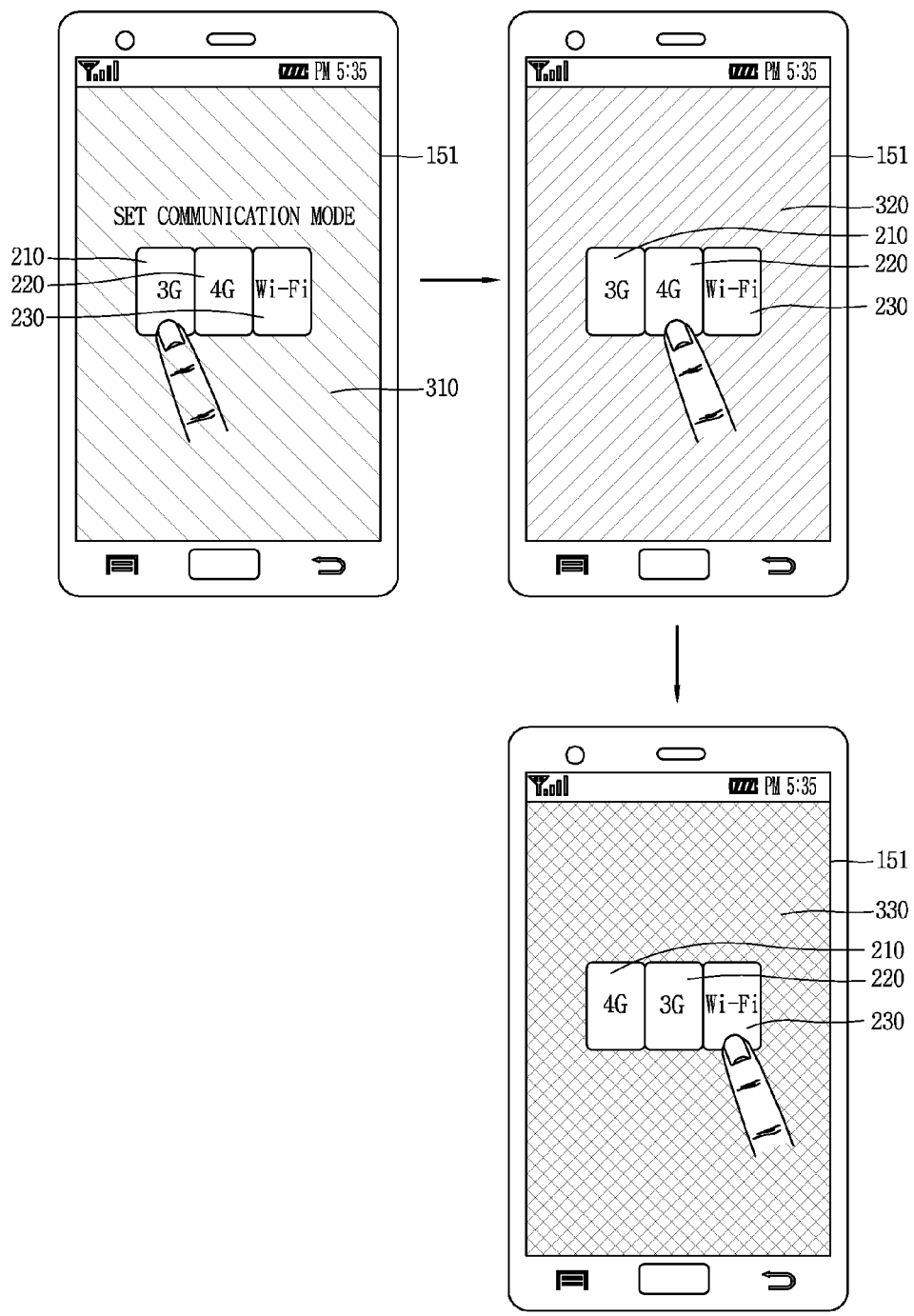
FIGS. 16 and 17 are conceptual views explaining the control method of FIG. 15.
Figure 17:
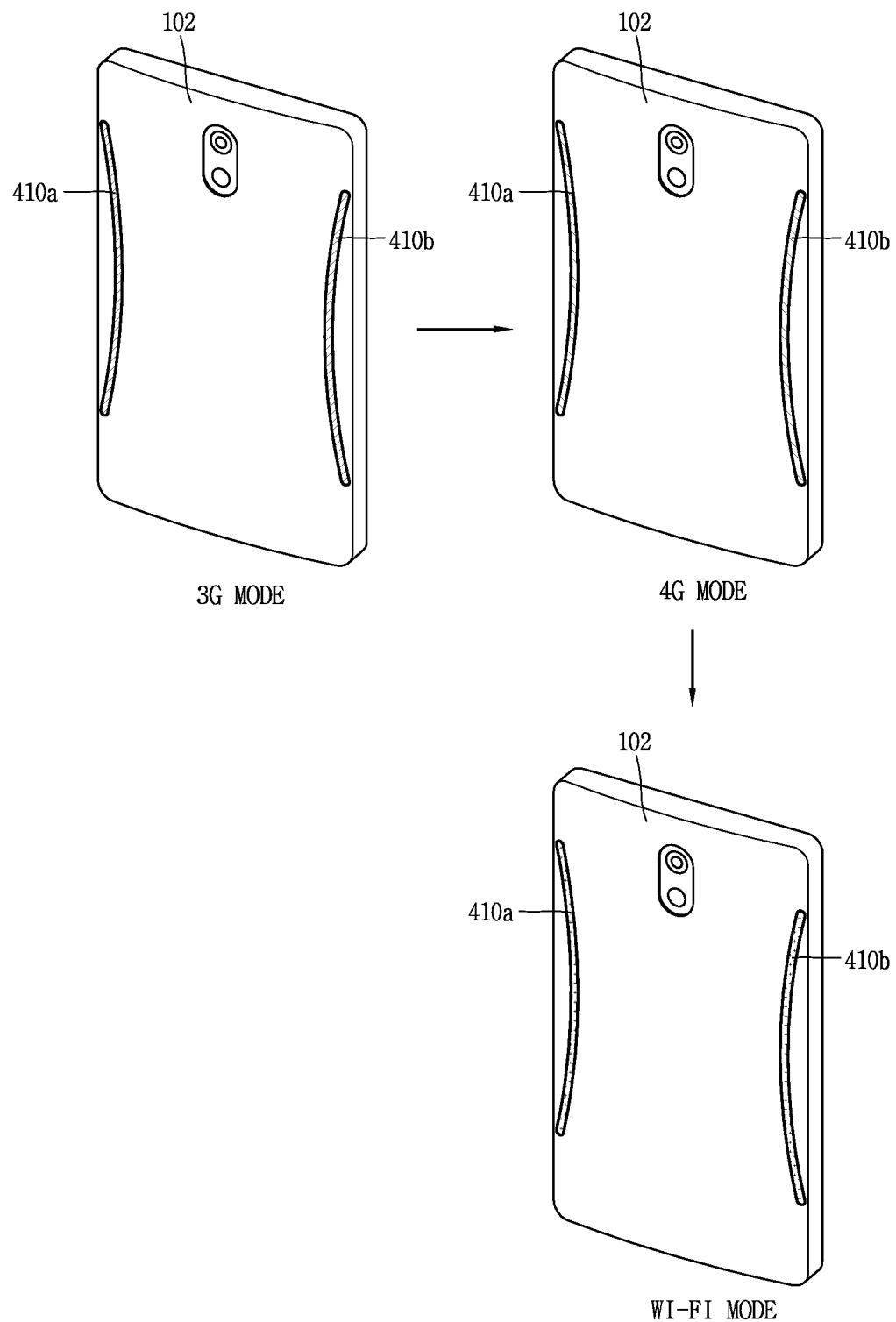

FIG. 15 is a flow chart explaining a control method of a mobile terminal according to an embodiment different from those of FIGS. 3 and 11 disclosed in the present disclosure. FIGS. 16 and 17 are conceptual views explaining the control method of FIG. 15.

First, in a control method of the mobile terminal according to an embodiment of the present invention, a communication mode of a wireless communication network connected to the wireless communication unit 110 is detected (S100).

Here, as described above, a 'communication mode of the wireless communication network' indicates a wireless communication network, such as a '3G mode', a 'WiFi' mode, or the like, to which the wireless communication unit 110 is currently connected. When the wireless communication unit 110 is connected to a 3G communication network, it may be said that the mobile terminal is set in the 3G communication mode.

Next, the controller 180 extracts color information matched to the communication mode detected in step S100 from the memory 160 (S200).

Here, the 'color information matched to the communication mode' is information obtained by matching corresponding colors are matched to various different communication modes, respectively, and the matched colors may be variably changed by the user or according to a setting of the controller 180.

For example, it is assumed that red, yellow, and green colors are matched to communication modes corresponding to the 3G communication network, the 4G communication network, and the WiFi communication network. When the 3G communication network is detected by the detection unit 181, the controller 180 may extract color information 'red' matched to the 3G communication network from the memory 160.

Next, the controller 180 controls color of light output from the illumination unit such that light of color corresponding to the extracted color information is output (S300).

Here, the illumination unit may be provided in a region of a front case 101 or a rear case 102 constituting the external appearance of the mobile terminal main body (or body 100 in FIGS. 2A and 2B) according to an embodiment of the present invention. Also, when the illumination unit is not provided on an outer portion of the mobile terminal, the illumination unit may be illumination provided within the mobile terminal to illuminate the display unit 151 or the user input unit 130. Namely, the illumination unit may be disposed on region to output light such that the user may recognize light, rather than being limited in disposition to a particular region of the mobile terminal according to an embodiment of the present invention.

Also, the illumination unit outputting light of different colors under the control of the controller 180 may be fabricated to be produced when the mobile terminal is fabricated. When such an illumination unit is not provided, an illumination unit illuminating the display unit 151 or the user input unit 130 set by the user or the controller 180 may be used.

Meanwhile, a method of outputting light of a color corresponding to color information extracted by the controller 180 will be described with reference to FIG. 16.

For example, as shown in FIG. 16, when a wireless communication network connected to the wireless communication unit 110 is the 3G communication network according to the detection results of the detection unit 181, the controller 180 controls the illumination unit of the display unit 151 such that color of light 310 corresponding to the 3G communication network is output to the display unit 151. Also, when a wireless communication network connected to the wireless communication unit 110 is the 4G communication network according to the detection results of the detection unit 181, the controller 180 controls the illumination unit of the display unit 151 such that color of light 320 corresponding to the 4G communication network is output to the display unit 151. Also, when a wireless communication network connected to the wireless communication unit 110 is the WiFi communication network, the controller 180 controls the illumination unit of the display unit 151 such that color of light 330 corresponding to the WiFi communication network is output to the display unit 151.

In FIG. 16, it is described that the color of light output from the display unit 151 is controlled, but rather than controlling the color of light output from the display unit 151, the controller may control color of light output to the illumination unit provided at the user input unit 130, e.g., provided at a lower portion of a hot key, of the mobile terminal 100.

Also, in the mobile terminal according to an embodiment of the present invention, as shown in FIG. 17, illumination units 410a and 410b may be provided on at least one region of the front case 101 (in FIG. 2A) or the rear case 102 (in FIG. 2B), e.g., may be provided to be adjacent to the edge of the case. The controller 180 may control the illumination units 410a and 410b to output light of a different color in each of the different communication modes.

Here, the illumination units 410a and 410b may be made of a light waveguide element, an optical fiber, or the like.

Also, the controller 180 may control the illumination units 410a and 410b to output light at every time interval previously set by the user or the controller.

In the above, it has been described that the illumination units output light of different colors on the basis of different communication modes according to the mobile terminal and the control method thereof according to an embodiment of the present invention.

Hereinafter, a method of controlling intensity of light output from illumination units on the basis of the strength of a radio signal of a wireless communication network detected by the detection unit will be described.

Figure 18:
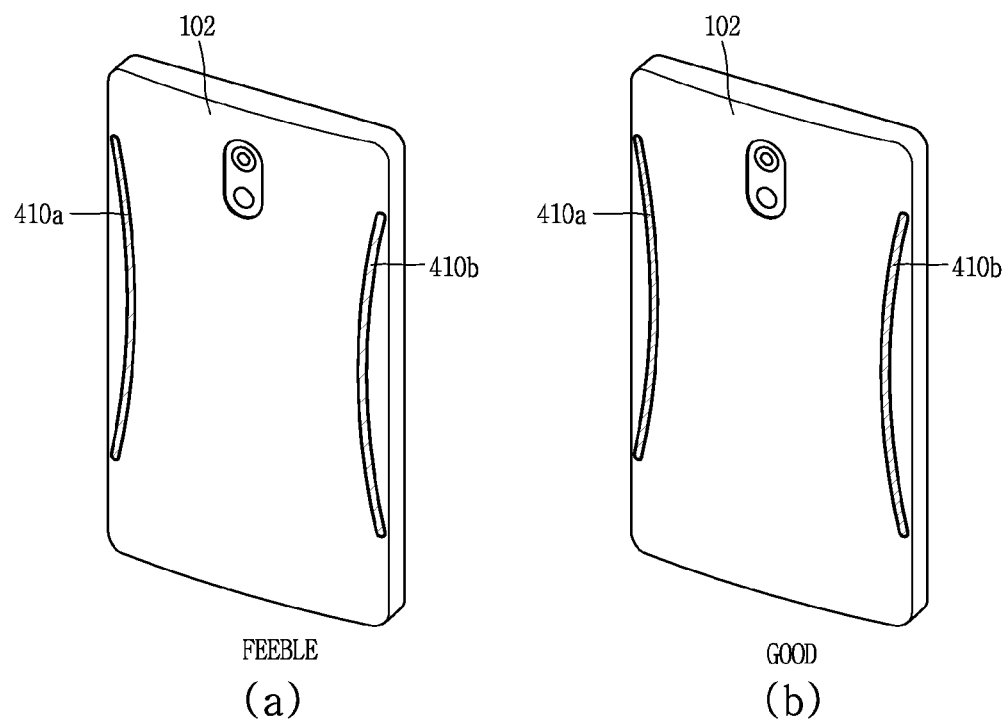
FIGS. 18 and 19 are conceptual views explaining a method of controlling an illumination unit according to a signal strength in the mobile terminal according to another embodiment disclosed in the present disclosure.
Figure 18:
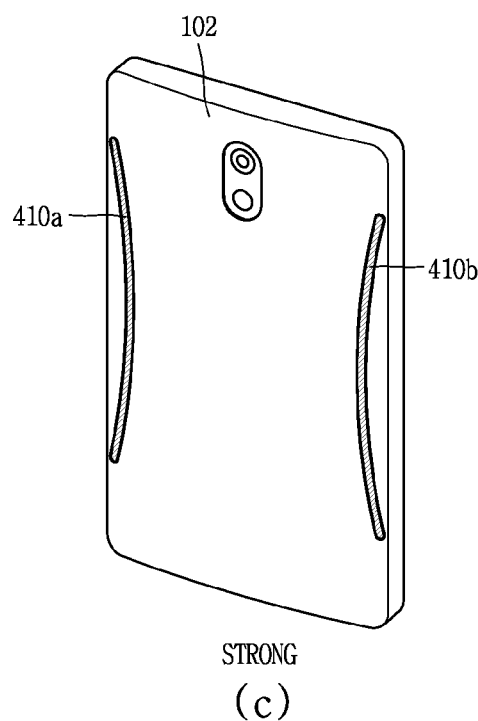
Figure 19:
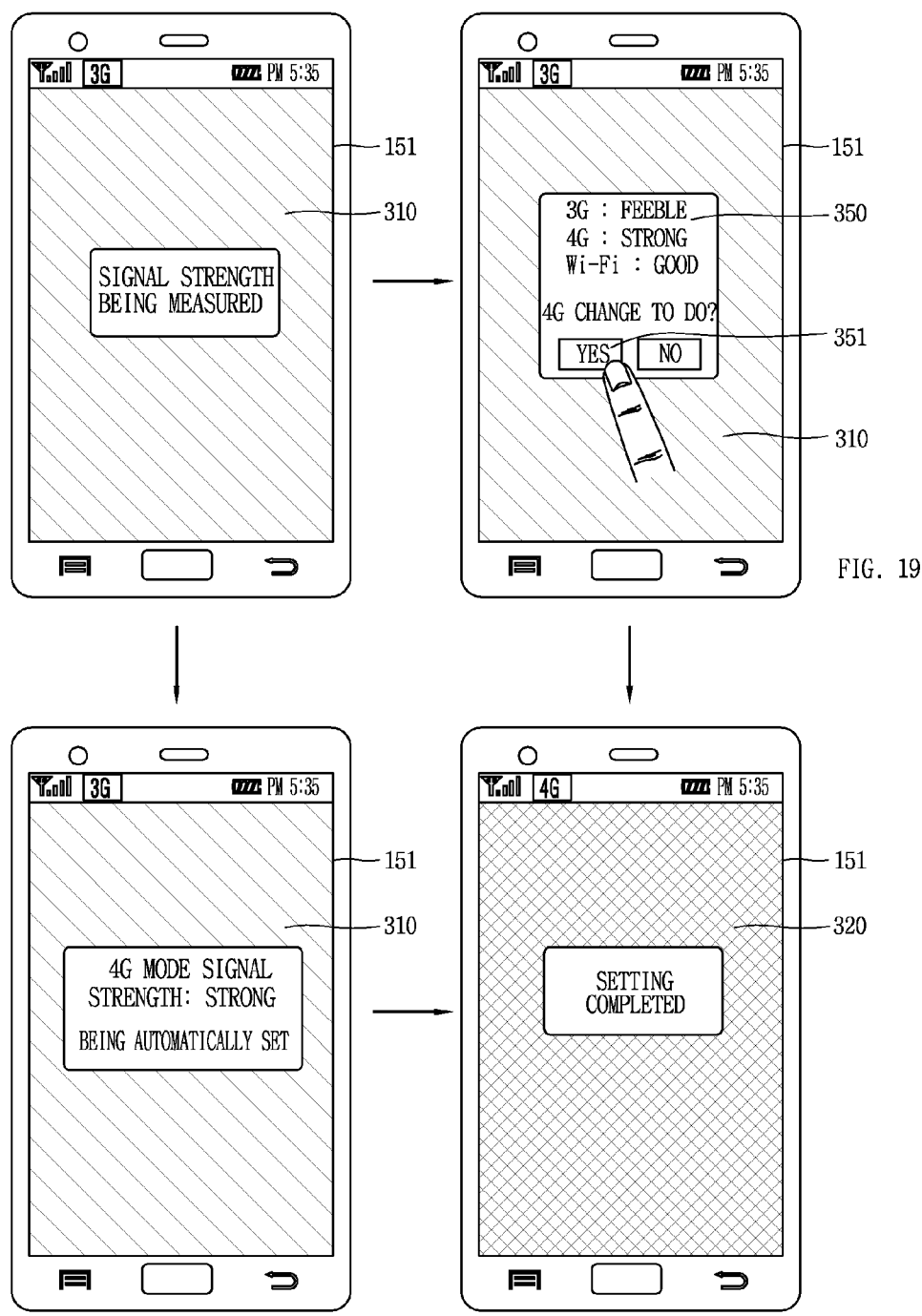

FIGS. 18 and 19 are conceptual views explaining a method of controlling an illumination unit according to a signal strength in the mobile terminal according to another embodiment disclosed in the present disclosure.

As described above, the detection unit 181 according to an embodiment of the present invention may be able to measure the strength of a radio signal of a wireless communication network that may be connected to or currently connected to the wireless communication unit 110, and the controller 180 may adjust the intensity of light output from the illumination units on the basis of the measurement results.

As shown in FIG. 18(a), when the strength of a radio signal from the wireless communication network connected to the wireless communication unit 110 is weak, the controller 180 controls the intensity of light output from the illumination units 410a and 410b such that it is weak, and as shown in FIG. 18(b), when the strength of a radio signal from the wireless communication network connected to the wireless communication unit 110 is normal, the controller 180 controls the intensity of light output from the illumination units 410a and 410b such that it is normal. Also, as shown in FIG. 18(c), when the strength of a radio signal from the wireless communication network connected to the wireless communication unit 110 is strong, the controller 180 controls the intensity of light output from the illumination units 410a and 410b such that it is strong.

Meanwhile, levels of intensity of light output from the illumination units according to the size of the radio signals may be controlled by stages by the controller or according to a user setting, and the information regarding the levels of intensity of light may be matched to levels of detected strength of radio signals, respectively, and stored as matching information in the memory 160.

Meanwhile, on the basis of the strength of a radio signal detected by the detection unit 181, when a wireless communication network having a stronger signal strength than that of the wireless communication network currently connected to the wireless communication unit 110 is detected, the controller 180 of the mobile terminal according to an embodiment of the present invention may switch from the current wireless communication network to the detected wireless communication network. In this case, the controller 180 may control the illumination units to output light of a color corresponding to the changed wireless communication network.

For example, as shown in FIG. 19, when the signal strength of the 4G communication network is detected to be greater according to the results of detecting radio signal strength of wireless communication networks by the detection unit 181, the controller may control the wireless communication unit 110 to automatically access the 4G communication network irrespective of a user selection.

Alternatively, the controller 180 may output information regarding the 4G communication network having the greater radio signal strength than that of the 3G communication network currently connected to the user through an information window 350, and when a select icon 351 is selected by the user, the controller 180 may control the wireless communication unit 110 to automatically access the 4G communication network.

Meanwhile, in the foregoing two cases, the color of the illumination units may be changed to correspond to the switched communication network (i.e., from 310 to 320).

As described above, in the mobile terminal and a control method thereof according to embodiments of the present invention, by outputting light of a color corresponding to the wireless communication network connected to the wireless communication unit through the illumination units, the user can easily recognize information related to the wireless communication network connected to the mobile terminal.

In the mobile terminal and a control method thereof according to embodiments of the present invention, by outputting icons corresponding to connectable communication networks to the locked screen and selecting any one of the icons, a locked state can be released and a communication mode can be set.

Also, in the mobile terminal and a control method thereof according to embodiments of the present invention, by displaying information regarding a communication network restricted from being used on the locked screen, information regarding available communication networks can be provided to the user.

In addition, in the mobile terminal and a control method thereof according to embodiments of the present invention, by displaying information regarding an optimized communication network corresponding to each application such that it is associated with each application, the user may be guided to select an optimum communication network in using an application.

Moreover, in the mobile terminal and a control method thereof according to embodiments of the present invention, by outputting light of a color corresponding to a connected communication network through the illumination units, even when the mobile terminal is locked, information related to a communication network can be provided to the user.

Furthermore, in the mobile terminal and a control method thereof according to embodiments of the present invention, by outputting light of different intensity to the illumination units according to the signal strength of a connected communication network, intuitional information regarding signal strength of a communication network can be provided to the user.

The mobile terminal as described above is not limited in its application of the configurations and methods, and the entirety or a portion of the embodiments may be selectively combined to be configured into various modifications.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a main body;
a display unit configured to display information;
a wireless communication unit configured to access a wireless communication network;
a detection unit configured to:
  detect the accessed wireless communication network via the wireless communication unit;
  detect communication mode information corresponding to at least one application installed in the main body; and
  match the detected communication mode information to the at least one application; and
a controller configured to:
associate information related to the accessed wireless communication network with the main body;
associate an icon corresponding to the at least one application with the detected communication mode information by using information related to the matching; and
control the display unit to display the associated icon and to display the matched communication mode information on a region adjacent to the icon.

2. The mobile terminal of claim 1, wherein the controller is further configured to:
control the display unit to display icons on a locked screen displayed in a locked state in which input of a control command related to the at least one application is limited, each of the icons corresponding to at least one wireless communication network detected by the detection unit;
release the locked state when selection of an icon of the displayed icons is detected; and
control the wireless communication unit to access a wireless communication network corresponding to the selected icon.

3. The mobile terminal of claim 2, wherein
the icon is selected via a touch input applied to the locked screen; and
the touch input corresponds to a condition for releasing the locked state.

4. The mobile terminal of claim 3, wherein:
the touch input comprises a drag input from a pre-set reference point to the selected icon; and
the controller is further configured to control the wireless communication unit to access a wireless communication network corresponding to the selected icon.

5. The mobile terminal of claim 2, wherein the detection unit is further configured to measure strength of radio signals transmitted and received between the wireless communication unit and the accessed wireless communication network.

6. The mobile terminal of claim 5, wherein the controller is further configured to determine positions of the icons displayed on the locked screen according to the measured strength.

7. The mobile terminal of claim 3, wherein:
the touch input comprises a drag input from a pre-set reference point to the selected icon;
the detection unit is further configured to measure strength of radio signals transmitted and received between the wireless communication unit and the accessed wireless communication network; and
the icons are displayed such that an icon corresponding to a wireless communication network having greater measured strength is displayed closer to the reference point.

8. The mobile terminal of claim 5, wherein the controller is further configured to control the display unit to display the icons such that transparency of each icon is based on the measured strength.

9. The mobile terminal of claim 2, wherein the controller is further configured to control the display unit to display an icon corresponding to a wireless communication network restricted from use such that the icon is differentiated from other displayed icons.

10. The mobile terminal of claim 9, wherein the controller is further configured to output notification information when the icon corresponding to the restricted wireless communication network is selected.

11. The mobile terminal of claim 10, wherein the controller is further configured to maintains the locked state when the icon is selected.

12. The mobile terminal of claim 2, wherein the controller is further configured to:
determine an application associated with the wireless communication network corresponding to the selected icon; and
control the display to display information related to the determined application when the locked state is released.

13. The mobile terminal of claim 12, wherein the controller is further configured to control the display to display an icon related to the determined application.

14. The mobile terminal of claim 2, wherein the controller is further configured to control the display to display data usage information on the displayed icons or on a region adjacent to the displayed icons, the data usage information related to the at least one wireless communication network corresponding to each of the icons.

15. The mobile terminal of claim 1, wherein the detected communication mode information is related to a communication mode of a plurality of communication modes available for accessing the main body that is best optimized to execute a function of the at least one application.

16. The mobile terminal of claim 1, wherein the controller is further configured to:
determine a communication mode of the accessed wireless communication network;
identify an application matched to the determined communication mode searching the information related to the matching; and
control the display unit to display an icon related to the identified application such that the icon is differentiated from displayed icons of other applications.

17. The mobile terminal of claim 16, wherein the controller is further configured to control the display unit to change the location of displayed icons according to the determined communication mode and the information related to the matching.

18. The mobile terminal of claim 1, wherein the controller is further configured to:
group applications of the at least one application that are matched to the detected communication mode information; and
control the display unit to display icons corresponding to the grouped applications according to the grouping.

19. The mobile terminal of claim 18, wherein the controller is further configured to:
determine a communication mode of the accessed wireless communication network; and
control the display unit to display icons of a group corresponding to the determined communication mode such that the icons are differentiated from other displayed icons.

20. The mobile terminal of claim 19, wherein the controller is further configured to control the display unit to display an icon corresponding to an application included in the group corresponding to the determined communication mode such that the icon is differentiated from a displayed icon corresponding to an application included in a different group.

21. A mobile terminal, comprising:
a main body comprising a front surface, a lateral surface, and a rear surface;
a display unit located on the front surface and configured to display information;
a wireless communication unit configured to access a wireless communication network;
an illumination unit located adjacent to an edge of the rear surface, the illumination unit comprising an optical waveguide element and configured to output light beams;
a detection unit configured to detect the accessed wireless communication network via the wireless communication unit; and
a controller configured to:
associate information related to the detected wireless communication network with the main body;
determine a communication mode of the accessed wireless communication network; and
control the illumination unit, to output light beams of different colors via the optical waveguide element according to the determined communication mode.

22. The mobile terminal of claim 21, further comprising a memory, wherein the controller is further configured to:
extract color information matched to the determined communication mode from the memory; and
control the illumination unit to output light beams corresponding to the extracted color information.

23. The mobile terminal of claim 21, wherein:
the detection unit is further configured to measure strength of radio signals transmitted and received via the accessed wireless communication network; and
the controller is further configured to control the illumination unit to vary an intensity of output light beams according to the measured strength.

24. The mobile terminal of claim 23, wherein the intensity of the output light beams is proportional to the measured strength.

25. The mobile terminal of claim 23, wherein:
the detection unit is further configured to:
detect at least one wireless communication network having a communication mode different from a communication mode of the accessed wireless communication network; and
measure strength of radio signals transmitted and received via the at least one detected wireless communication network; and
the controller is further configured to:
control the wireless communication unit to connect to the at least one detected wireless communication network when the measured strength of the radio signals of the detected at least one wireless communication network is greater than the measured strength of the radio signals of the accessed wireless communication network; and control the illumination unit to output light beams of a color matched to the communication mode of the detected at least one wireless communication network.

26. The mobile terminal of claim 25, wherein the controller is further configured to control the wireless communication unit to automatically access the at least one detected wireless communication network when the measured strength of the radio signals of the detected at least one wireless communication network is greater than the measured strength of the radio signals of the accessed wireless communication network.

27. The mobile terminal of claim 25, wherein the controller is further configured to:

output information related to the detected at least one wireless communication network to a user when the measured strength the radio signals of the detected at least one wireless communication network is greater than the measured strength of of the radio signals of the accessed wireless communication network; and control the wireless communication unit to access the detected at least one wireless communication network according to a user selection.

28. A control method of a mobile terminal including an illumination unit configured to output light beams of different colors, the method comprising:

detecting a communication mode of a wireless communication network accessed via a wireless communication unit;

associating information related to the accessed wireless communication network with a main body of the mobile terminal;

measuring strength of radio signals transmitted and received via the accessed wireless communication network:

obtaining color information matched to the detected communication mode; and varying the color of the light beams output by the illumination unit such that light of a color corresponding to the obtained color information is output and varying an intensity of the output light beams according to the measured strength.

29. A control method of a mobile terminal, the method comprising:

detecting communication mode information corresponding to at least one application;

matching the detected communication mode and the at least one application;

associating an icon corresponding to the at least one application with the detected communication mode information by using information related to the matching;

displaying the icon on a display unit and displaying communication mode information matched to the at least one application on a region of the display unit adjacent to the displayed icon.

30. The method of claim 29, wherein associating the icon with the detected communication mode comprises:

searching for matching information corresponding to the detected communication mode; and displaying an icon of an application of the at least one application that is related to the searched matching information on the display unit such that the icon is differentiated from displayed icons of different applications of the at least one application.

\* \* \* \* \*